US012704067B2

(12) United States Patent
Sun et al.

(10) Patent No.: US 12,704,067 B2
(45) Date of Patent: Aug. 11, 2026

(54) GROOVE-TYPE SKELETON, SEALED LINING STRUCTURE, UNDERGROUND GAS STORAGE AND CONSTRUCTION METHOD

(71) Applicant: INSTITUTE OF ROCK AND SOIL MECHANICS, CHINESE ACADEMY OF SCIENCES, Wuhan (CN)

(72) Inventors: Guanhua Sun, Wuhan (CN); Zhangxing Wang, Wuhan (CN); Xianyang Yu, Wuhan (CN); Chunguang Li, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 82 days.

(21) Appl. No.: 18/737,055

(22) Filed: Jun. 7, 2024

(65) Prior Publication Data

US 2025/0092786 A1 Mar. 20, 2025

(30) Foreign Application Priority Data

Sep. 19, 2023 (CN) ......................... 202311211924.1
Sep. 19, 2023 (CN) ......................... 202311219465.1
Nov. 15, 2023 (CN) ......................... 202311525587.3

(51) Int. Cl.
*E21D 11/38* (2006.01)
*F17C 3/00* (2006.01)

(52) U.S. Cl.
CPC ............ *E21D 11/388* (2016.01); *F17C 3/005* (2013.01); *F17C 2203/0604* (2013.01)

(58) Field of Classification Search
CPC . E21D 11/388; F17C 3/005; F17C 2203/0604
See application file for complete search history.

(56) References Cited

U.S. PATENT DOCUMENTS 5,454,195 A * 10/1995 Hallsten ................. B65D 90/24 405/114
5,660,912 A * 8/1997 Menzel ................... F16L 11/16 405/152

(Continued)

FOREIGN PATENT DOCUMENTS

CN 1134138 A * 10/1996 ........... B65D 90/501

*Primary Examiner* — Frederick L Lagman
(74) *Attorney, Agent, or Firm* — Platinum Intellectual Property PC

(57) ABSTRACT

The present invention provides a groove-type skeleton, a sealed lining structure, an underground gas storage, which belong to the technical field of compressed air energy storage. The groove-type skeleton includes a fixed bottom plate, which has a length direction and a width direction. The fixed bottom plate forms a semi-open receiving space along the length direction at the middle axis, and the top edge of at least one side of the semi-open receiving space extends inward to form a protrusion. The sealed lining structure includes an airtight layer and the groove-type skeleton. The underground gas storage includes a concrete lining layer and the sealed lining structure. The groove-type skeleton can be combined to form a sealed lining structure, which forms an underground gas storage. Its construction period is shorter than that of welded steel plates and its cost is lower.

15 Claims, 13 Drawing Sheets

(56) References Cited

U.S. PATENT DOCUMENTS

| | | | | |
|---|---|---|---|---|
| 8,327,886 | B2 * | 12/2012 | Nishiyama | F16L 55/162<br>405/153 |
| 9,016,980 | B2 * | 4/2015 | Wheeler | B65G 3/04<br>405/129.75 |
| 10,415,210 | B2 * | 9/2019 | Powell | E02B 7/02 |
| 2004/0238698 | A1 * | 12/2004 | Shereyk | F16B 5/0685<br>248/74.2 |
| 2005/0106347 | A1 * | 5/2005 | Wilson | F16L 55/1655<br>428/36.9 |
| 2014/0147212 | A1 * | 5/2014 | Wheeler | B09C 1/00<br>405/129.75 |

* cited by examiner

GROOVE-TYPE SKELETON, SEALED LINING STRUCTURE, UNDERGROUND GAS STORAGE AND CONSTRUCTION METHOD

RELATED APPLICATIONS

This application is a Non-provisional Application under 35 USC § 111 (a), which claims priorities to Chinese Patent Application No. 202311525587.3, filed Nov. 15, 2023, Chinese Patent Application No. 202311211924.1, filed Sep. 19, 2023, and Chinese Patent Application No. 202311219465.1, filed Sep. 19, 2023, the disclosure of all of which is hereby incorporated by reference in its entirety.

TECHNICAL FIELD

The present invention relates to the field of compressed air energy storage technology, and in particular to a groove-type skeleton, a sealed lining structure, an underground gas storage, and a construction method.

BACKGROUND TECHNOLOGY

Compressed air energy storage technology is a large-capacity long-term physical energy storage technology that does not involve the combustion of fossil fuels and does not emit any harmful substances, making it more environmentally friendly. It can greatly improve the spatial and temporal structure of power generation and consumption in the power grid, increase the peak regulation capacity of the grid, and solve the intermittency problem of renewable energy. It is being widely promoted and applied in China. Compressed air energy storage systems mainly use ground steel tanks/steel pipes, salt rock caves, and artificial lined chambers as high-pressure air storage containers. Large-scale storage devices currently rely on salt caves and artificial lined chambers. As industrialization progresses, artificial lined chambers will gradually become a widely used means of gas storage. Unlike general underground chambers, artificial lined chambers dedicated to gas storage will withstand high internal pressure, high temperature changes, and high frequency alternating loads, which poses new challenges for the design of the chamber sealing layer.

SUMMARY OF THE INVENTION

In view of this, the present invention provides a groove-type skeleton, a sealing lining structure, an underground gas storage and a construction method. The groove-type skeleton can be combined to form a sealing lining structure for the construction of an underground gas storage, so that the sealing lining structure is formed on the inner wall of the underground gas storage. The construction period is shorter than that of welding steel plates, and the cost is lower, making it more suitable for practical use.

In order to achieve the first objective, the technical solution of the groove-type skeleton provided by the present invention is as follows:

The groove-type framework provided by the present invention includes a fixed base plate (2), The fixed base plate (2) has a length direction and a width direction, The fixed base plate (2) forms a half-open receiving space at the central axis along the length direction, and the top edge of at least one side of the half-open receiving space extends inward to form a protrusion, so that a groove is formed on the inner side corresponding to the protrusion in the half-open receiving space, and the protrusion and the groove together form a limit groove.

The groove-type framework provided by the present invention can also be further realized by using the following technical measures.

Preferably, the thickness of the fixed base plate (2) at the central axis along the length direction is greater than the thickness of the fixed base plate (2) on both sides, so that the center of the radial cross-section of the fixed base plate (2) rises and gradually decreases in thickness towards both sides.

Preferably, the fixed base plate (2) is symmetrical about the central axis along the length direction, forming an axisymmetric structure. The top edges on both sides of the clamping opening with a semi-open accommodation space extend inward to form protrusions, so that the inner side corresponding to the protrusions in the clamping opening with a semi-open accommodation space forms grooves, and the protrusions and corresponding side grooves form limit grooves.

Preferably, the groove-type skeleton is made of corrosion-resistant steel.

In order to achieve the second objective, the technical solution of the sealing lining structure provided by the present invention is as follows:

The sealing lining structure provided by the present invention includes a gas-tight layer (3) and at least one groove-type skeleton provided by the present invention, The airtight layer (3) is arranged on the groove-type skeleton through the limit groove formed at the clamping opening with a semi-open accommodation space.

The sealing lining structure provided by the present invention can also be further realized by adopting the following technical measures.

Preferably, the airtight layer (3) is made of a material that can be deformed under pressure.

Preferably, the edge of the airtight layer (3) is provided with a fitting part that fits with the limit groove formed at the clamping point of the semi-open storage space, and the airtight layer (3) is arranged on the groove-type skeleton through the fitting part.

Preferably, the groove-type skeleton includes multiple, a plurality of the grooved skeletons are arranged in a crisscross pattern, forming a hollow space between them;

The airtight layer (3) is arranged in the hollow through the limit groove formed at the opening with a semi-open storage space.

Preferably, the sealing lining structure is a sealing lining structure arranged on the inner wall of the cylindrical shape, The groove-type skeleton includes a plurality of axial skeletons and a plurality of circumferential skeletons, which are crisscrossed and connected to form a hollow space between the plurality of groove-type skeletons;

The airtight layer (3) is positioned within the hollowed-out area through a limit groove formed at the clamping opening with a semi-open storage space.

Preferably, the plurality of axial skeletons and the plurality of circumferential skeletons are uniformly arranged.

In order to achieve the third objective, the technical solution of the underground gas storage provided by the present invention is as follows:

The underground gas storage provided by the present invention includes a concrete lining layer (1) and a sealed lining structure provided by the present invention, The inner wall of the concrete lining layer (1) is cylindrical, The sealing lining structure is fixedly arranged on the inner wall of the concrete lining layer (1) through the fixed bottom plate (2) of the groove-type skeleton.

In order to achieve the fourth objective, the technical solution of the construction method of the underground gas storage provided by the present invention is as follows:

The construction method of the underground gas storage provided by the present invention includes the following steps:

Assembling a groove-type skeleton according to the inner diameter of the underground gas storage, the groove-type skeleton comprising a plurality of axial skeletons and a plurality of circumferential skeletons, the plurality of axial skeletons and the plurality of circumferential skeletons being connected in a crisscross pattern, forming a hollow space between the plurality of groove-type skeletons;

Laying the groove-type skeleton to the inner wall of the underground gas storage, and fixing the groove-type skeleton to the inner wall of the underground gas storage;

The airtight layer (3) is embedded in the hollow through the limit groove formed at the clamping opening with a semi-open storage space, so that the inner wall of the underground gas storage forms a sealed lining structure provided by the present invention.

The construction method of the underground gas storage provided by the present invention can also be further implemented by using the following technical measures.

Preferably, the grooved skeleton is laid on the inner wall of the underground gas storage, and the fixing of the grooved skeleton to the inner wall of the underground gas storage specifically includes the following steps:

Drilling a first type of connection hole on the inner wall of the underground gas storage;

Adjusting the position of the groove-type skeleton so that the second connection hole of the groove-type skeleton corresponds to the position of the first connection hole on the inner wall of the underground gas storage;

Simultaneously screwing the set bolt (4) into the first and second connection holes, so that the groove-type skeleton is fixed to the inner wall of the underground gas storage.

Preferably, after the step of embedding the limiting groove formed by the airtight layer (3) through the clamping opening with a semi-open storage space into the hollow, so that the inner wall of the underground gas storage forms a sealed lining structure provided by the present invention, the following steps are also included:

Carrying out a gas storage test to the underground gas storage to determine the sealing performance of the underground gas storage;

Real-time monitoring is conducted for possible leakage points of the underground gas storage.

Preferably, in the step of performing real-time monitoring on possible leakage points of the underground gas storage, the possible leakage points include: the connection between the airtight layer (3) and the groove-type skeleton, the connection between the connection part and the umbrella-shaped part of the groove-type skeleton, the connection between the fixed chassis of the groove-type skeleton and the inner wall of the underground gas storage, and one or more locations in the airtight layer (3) itself.

Preferably, the real-time monitoring of possible leakage points in the underground gas storage includes the following steps:

At the potential leakage points of the underground gas storage, gas flow monitoring instruments are installed, and each instrument is labeled with its location;

Setting an alarm threshold for the gas flow monitoring instrument according to the location of the gas flow monitoring instrument;

When an abnormal gas flow alarm occurs, the location of the gas leakage point in the underground gas storage is determined based on the location label of the gas flow monitoring instrument that triggered the alarm.

The groove-type skeleton provided by the present invention can embed the airtight layer 3 using the limit groove formed at the clamping opening of the semi-open accommodating space. Since the top edge of at least one side of the clamping opening of the semi-open accommodating space extends inward to form a protrusion, a groove is formed on the inner side corresponding to the protrusion in the clamping opening with a semi-open accommodating space. The protrusion and the groove together form a limit groove. Therefore, it is possible to form a fit between the limit groove formed at the clamping opening of the semi-open accommodating space and the airtight layer 3, thereby avoiding displacement or detachment of the airtight layer 3 and ensuring airtightness. Therefore, it can be formed on the inner side of the concrete lining layer 1 of an underground gas storage to achieve airtight performance of the underground gas storage. Its construction period is shorter than that of welded steel plates, its cost is lower, it has good sealing performance, and it is easy to replace parts and maintain. On the premise of ensuring fastening, its airtightness can meet the requirements of use. The airtight layer 3 has a short construction period and can be prefabricated. Compared with the traditional steel plate lining that requires on-site welding, it can save a lot of construction time and cost, and it can be directly replaced when damaged during maintenance.

ILLUSTRATION

Various other advantages and benefits will become clear to those of ordinary skill in the art by reading the detailed description of the preferred embodiments below. The drawings are only for the purpose of illustrating the preferred embodiments and are not considered to be limitations of the invention. Also, throughout the drawings, the same reference symbols are used to represent the same components. In the drawings.

SPECIFIC IMPLEMENTATION METHOD

Figure 1:
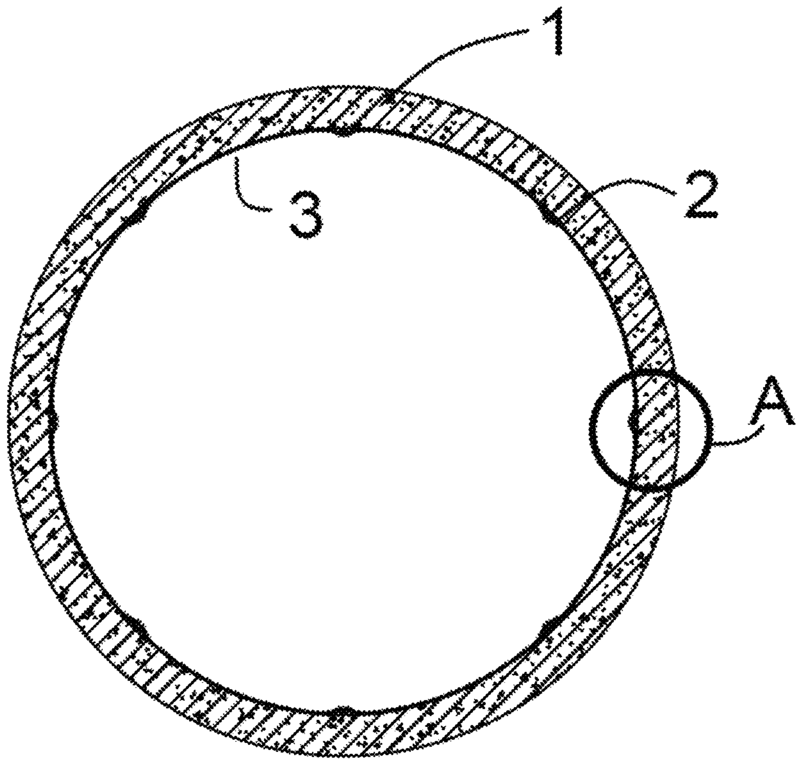
FIG. 1 is a schematic diagram of the radial section structure of the underground gas storage provided by the embodiment of the invention.
Figure 2:
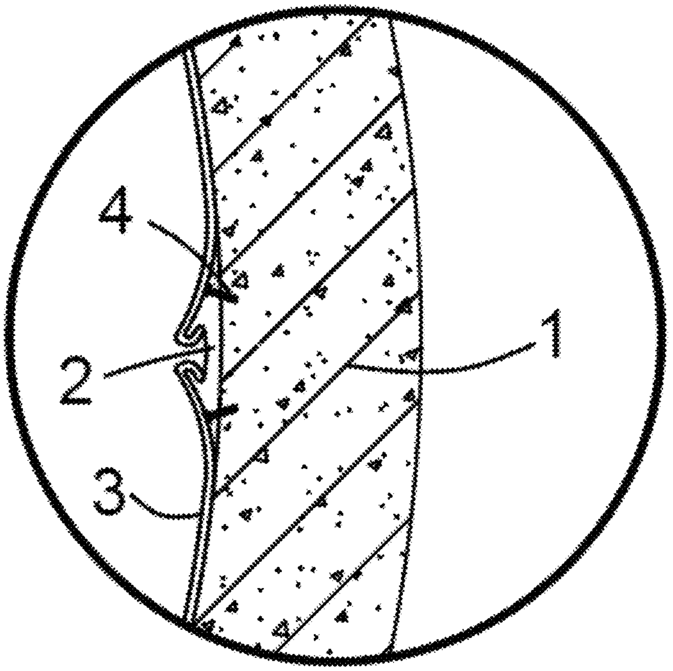
FIG. 2 is a partial enlarged structural diagram of part A in FIG. 1.
Figure 3:
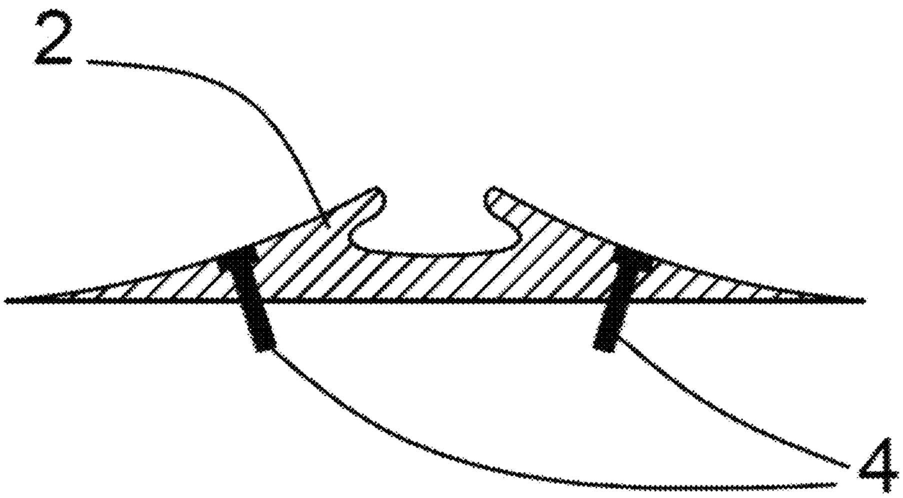
FIG. 3 is a structural diagram of a typical section of the groove-type skeleton provided by the embodiment of the invention.
Figure 4:
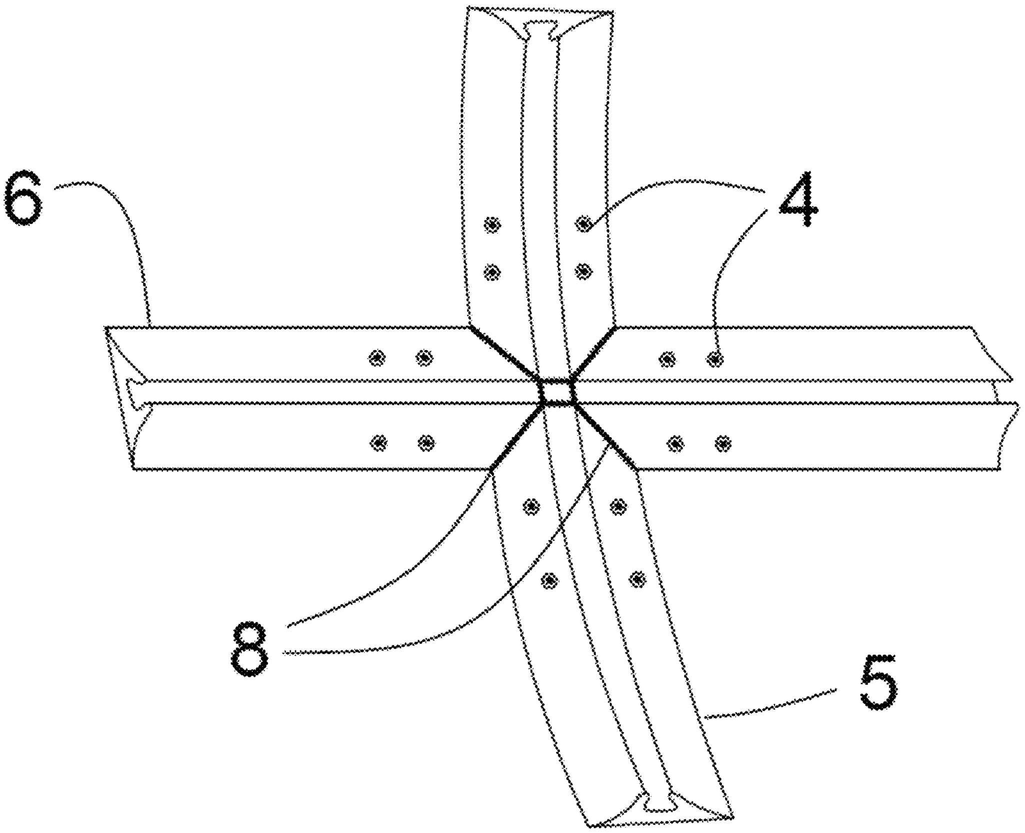
FIG. 4 is a structural diagram of the crisscross connection of the groove-type skeleton provided by the embodiment of the invention.
Figure 5:
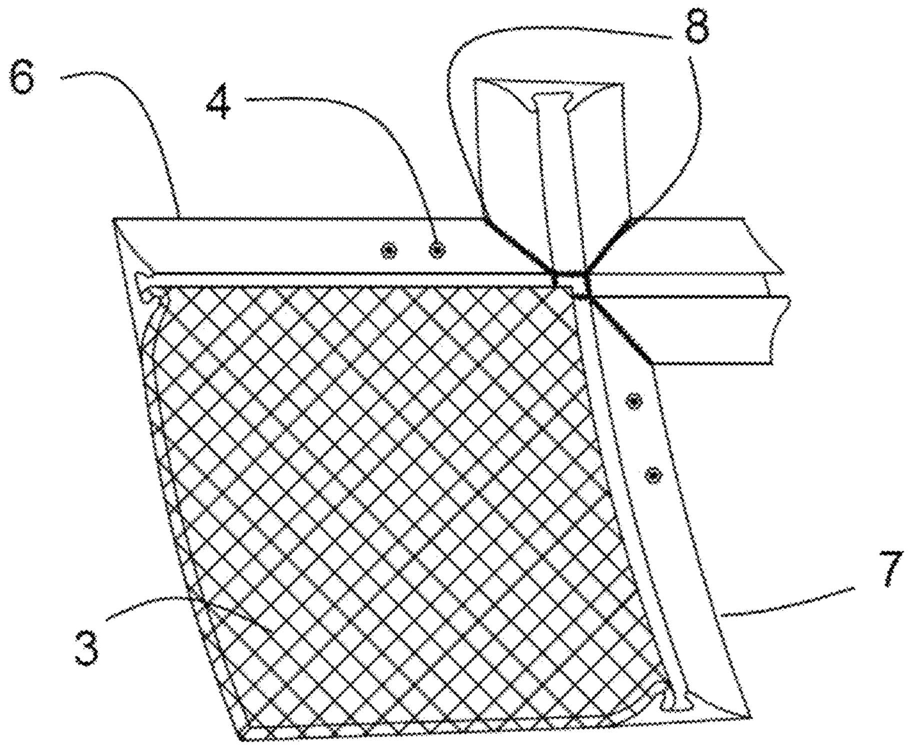
FIG. 5 is a structural diagram of a typical section after the connection between the groove-type skeleton and the airtight layer provided by the embodiment of the invention.
Figure 6:
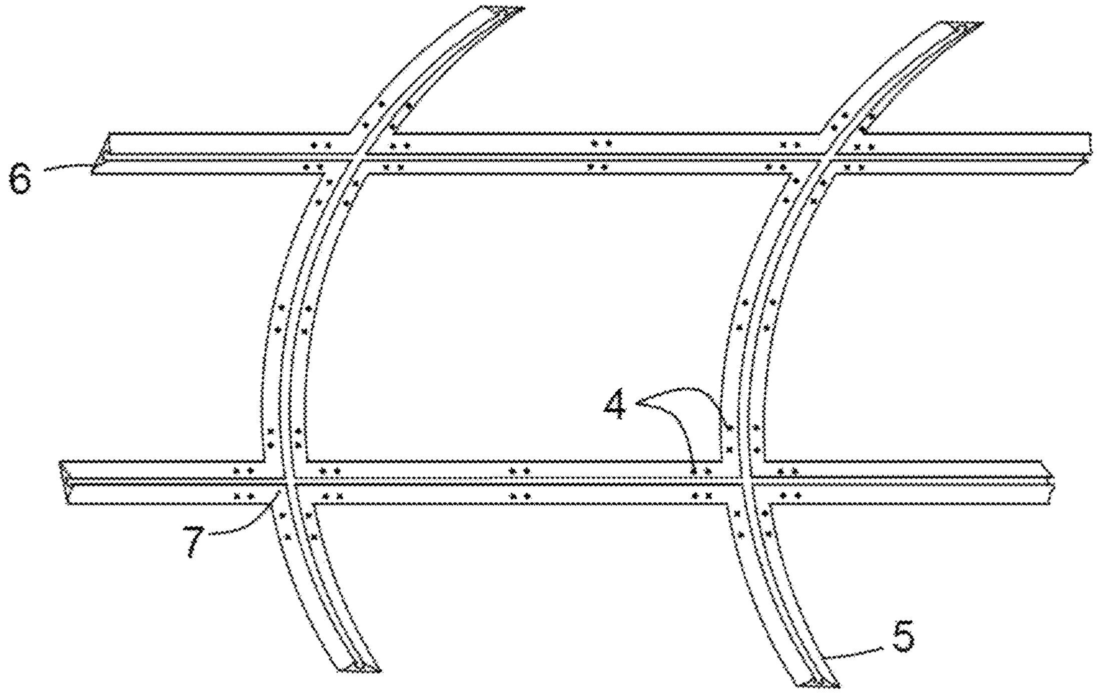
FIG. 6 is a structural diagram of a typical section of the groove-type skeleton of the sealing lining structure of the cylindrical inner wall provided by the embodiment of the invention.
Figure 7:
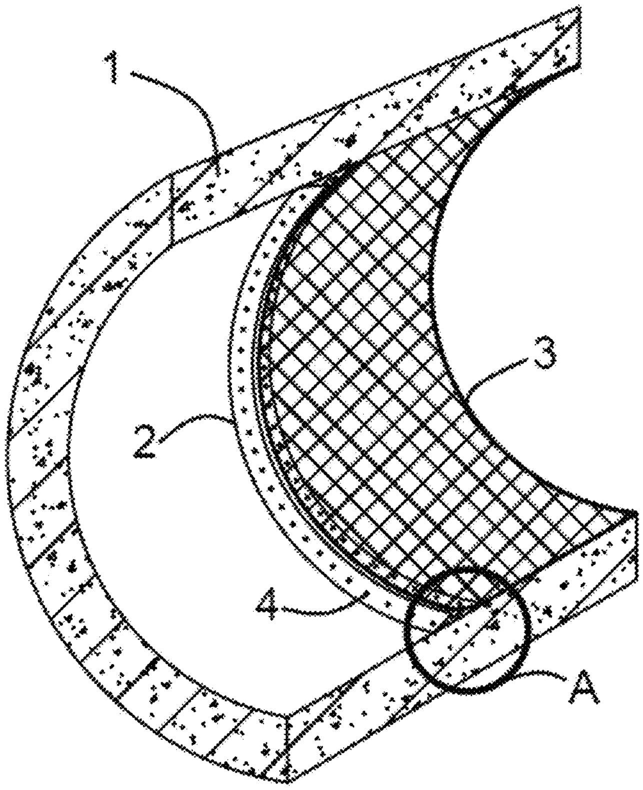
FIG. 7 is a typical sectional structural diagram of an underground chamber provided by an embodiment of the present invention.
Figure 8:
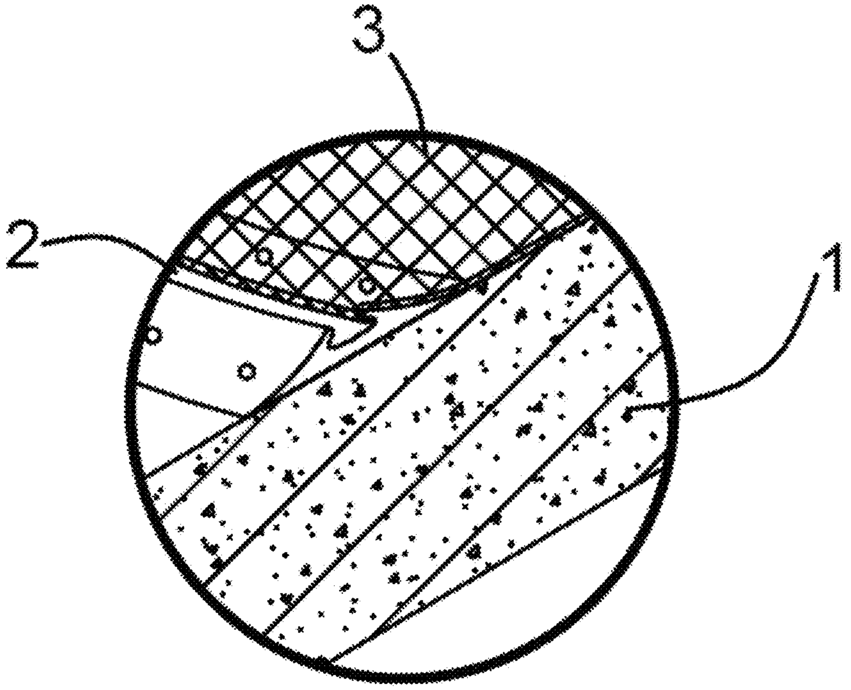
FIG. 8 is a partial enlarged structural diagram of part A in FIG. 7.
Figure 9:
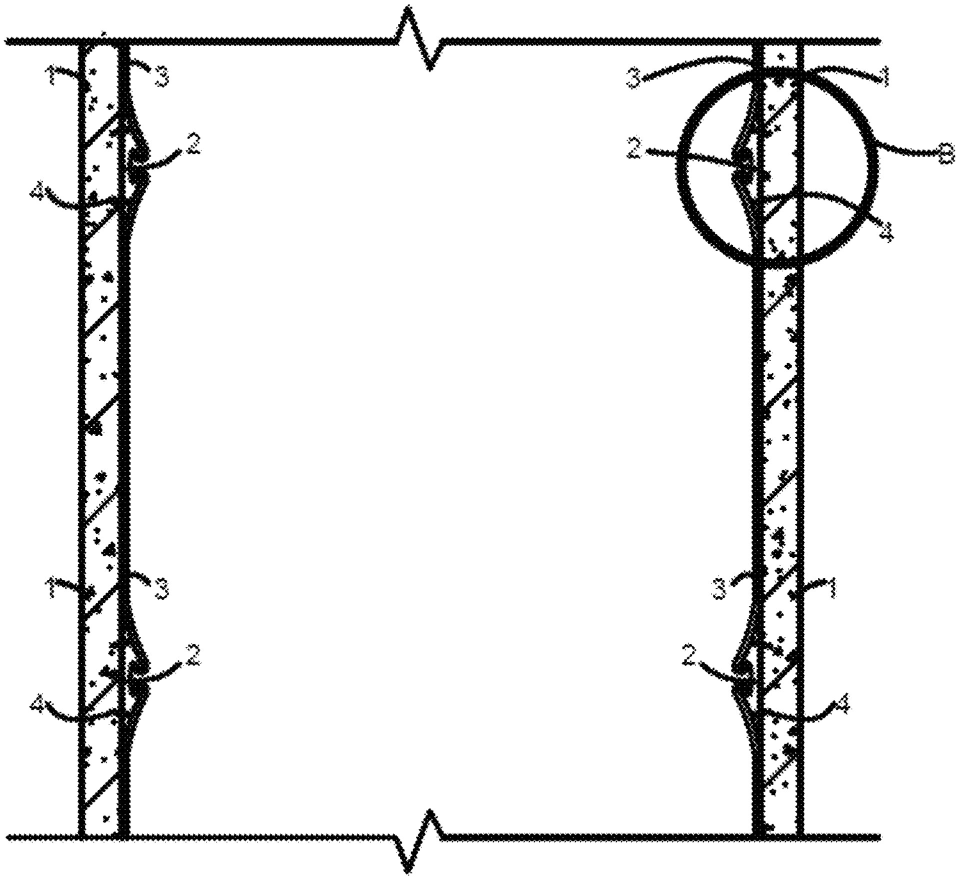
FIG. 9 is a partial structural diagram of the axial section of the underground chamber provided by the embodiment of the invention.
Figure 10:
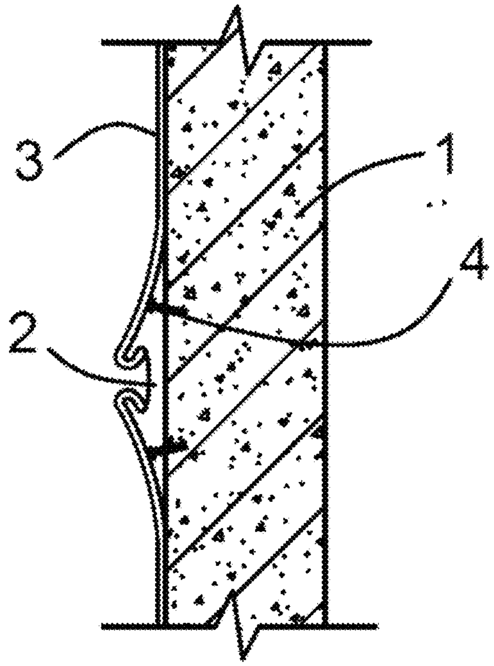
FIG. 10 is a partially enlarged structural diagram of part B in FIG. 9.
Figure 11:
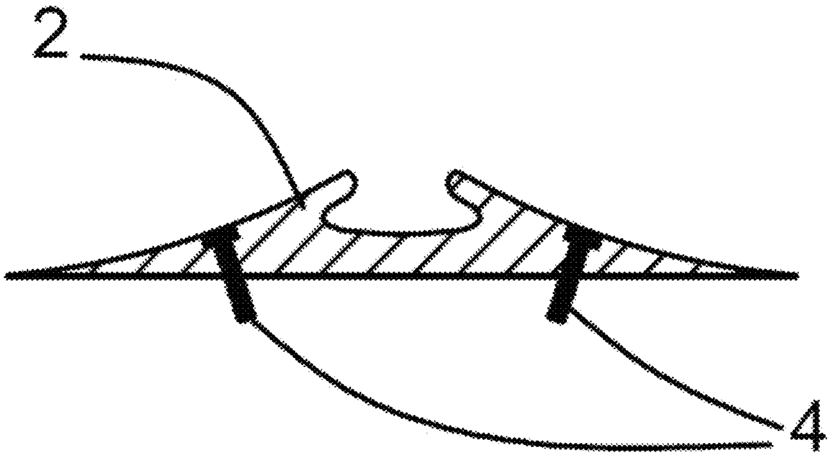
FIG. 11 is a structural diagram of a typical section of a groove-type shaped part provided by an embodiment of the present invention.
Figure 12:
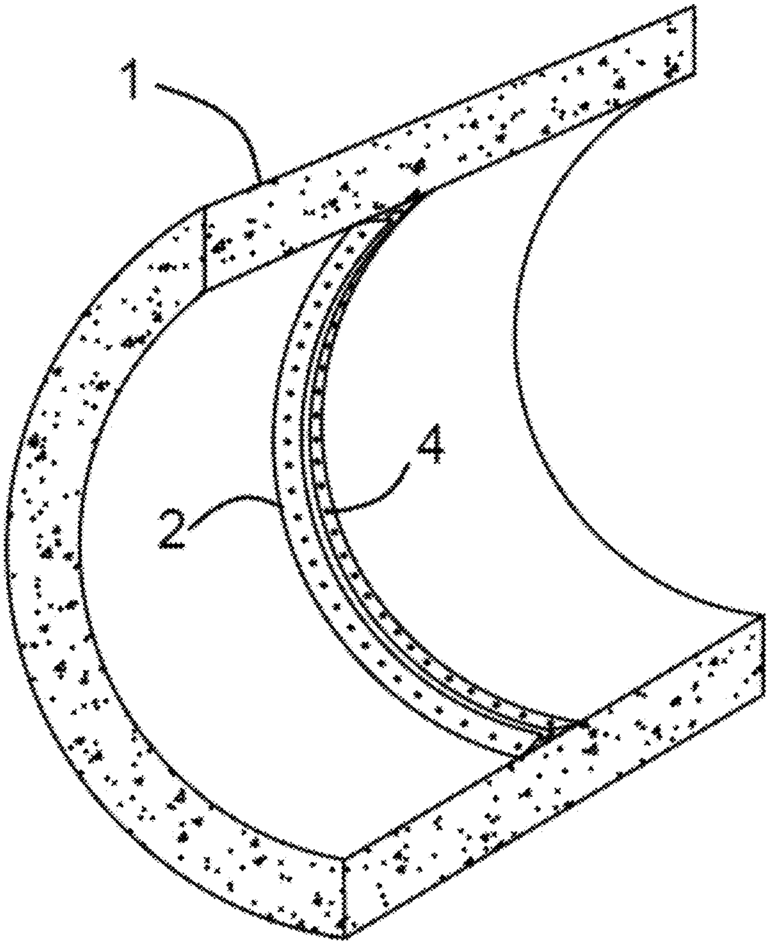
FIG. 12 is a structural diagram of the ring-shaped groove-type shaped piece provided by the embodiment of the invention, which is adapted to the inner wall of the underground chamber.

In view of this, the present invention provides a groove-type skeleton, a sealing lining structure, an underground gas storage and a construction method. The groove-type skeleton can be combined to form a sealing lining structure for the construction of the underground gas storage, so that the sealing lining structure is formed on the inner wall of the underground gas storage, which can significantly enhance the sealing performance of the underground gas storage and is more suitable for practical use.

After arduous efforts, the inventor found that,

The traditional design idea is to use steel plates as sealing materials, but steel plate sealing has high costs, good thermal insulation performance, and long-term high temperature load effects. Relevant research has shown that rubber materials have the basic conditions for application in high-pressure gas storage chamber sealing layers, with low unit cost and good mechanical and sealing performance. However, traditional rubber gas storage materials are all manufactured as a whole structure at the factory, making installation in underground gas storage chambers very difficult. How to design and install a simple and combined sealing lining structure that can ensure sealing performance has become an urgent problem to be solved.

To further elaborate on the technical means and efficacy of the invention to achieve the intended purpose of the invention, the following detailed description of the specific implementation methods, structures, features, and efficacy of a groove-type skeleton, sealing lining structure, underground gas storage, and construction method proposed according to the invention is provided in conjunction with the accompanying drawings and preferred embodiments. In the following description, different "embodiments" or "embodiments" do not necessarily refer to the same embodiment. In addition, specific features, structures, or characteristics in one or more embodiments can be combined in any suitable form.

The term "and/or" in this article is only a description of the association relationship between related objects, indicating that there can be three types of relationships, such as A and/or B. Specifically, it can include both A and B, or A alone, or B alone, or any combination of the three.

Grooved Skeleton

Referring to FIGS. 1 to 6, the groove-type skeleton provided by the present invention includes a fixed base plate 2. The fixed base plate 2 has a length direction and a width direction. The fixed base plate 2 forms a clamping opening with a semi-open accommodation space along the length direction at the central axis. The top edge of at least one side of the clamping opening with a semi-open accommodation space extends inwardly to form a protrusion, so that a groove is formed inside the clamping opening with a semi-open accommodation space corresponding to the protrusion, and the protrusion and groove together form a limit groove.

The groove-type skeleton provided by the present invention can embed the airtight layer 3 using the limit groove formed at the clamping opening of the semi-open accommodation space it forms. Since the top edge of at least one side of the clamping opening of the semi-open accommodation space extends inward to form a protrusion, a groove is formed on the inner side corresponding to the protrusion in the clamping opening with a semi-open accommodation space. The protrusion and the groove together form a limit groove, so that the limit groove formed at the clamping opening of the semi-open accommodation space can be fitted with the airtight layer 3, thereby avoiding displacement or detachment of the airtight layer 3 and ensuring airtightness. Therefore, it can be formed on the inner side of the concrete lining layer 1 of an underground gas storage facility to achieve airtight performance of the underground gas storage facility. Its construction period is shorter than that of welded steel plates, its cost is lower, it has good sealing performance, and its parts are easy to replace and maintain. On the premise of ensuring fastening, its airtightness can meet the requirements of use. The airtight layer 3 has a short construction period and can be prefabricated. Compared with the traditional steel plate lining that requires on-site welding, it can save a lot of construction time and cost, and it can be directly replaced when damaged during maintenance.

Among them, the thickness of the fixed bottom plate 2 at the middle axis along the length direction is greater than the thickness of the two sides of the fixed bottom plate 2, so that the center of the radial cross-section of the fixed bottom plate 2 rises and gradually decreases in thickness towards both sides. In this case, due to the rise in the center of the radial cross-section of the fixed bottom plate 2, the depth of the limit groove can be increased, and the fitting force between the fixed bottom plate 2 and the airtight layer 3 increases, so that the fitting force between the fixed bottom plate 2 and the airtight layer 3 is more stable.

The fixed base plate 2 is symmetrical along the central axis in the length direction, forming an axisymmetric structure. The top edges on both sides of the semi-open receiving space of the clamping opening extend inward to form protrusions, so that the inner side corresponding to the protrusions in the semi-open receiving space of the clamping opening forms grooves, and the protrusions and corresponding side grooves form limit grooves. In this case, both sides of the semi-open receiving space of the clamping opening can form a fitting force with a gas-tight layer 3, enabling the groove-type skeleton provided by the embodiment of the present invention to be formed in the middle part of the sealed lining structure, while the single-sided limit groove can only be applied to the edge part of the sealed lining structure.

The groove-type skeleton is made of corrosion-resistant steel. The carbon content is less than 2.11%, and it contains no other alloying elements except for iron, carbon, and impurities such as silicon, manganese, phosphorus, and sulfur within the limit. The carbon content of industrial carbon steel is generally 0.05% to 1.35%. The performance of corrosion-resistant steel mainly depends on the carbon content. As the carbon content increases, the strength and hardness of the steel increase, while the plasticity, toughness, and weldability decrease. Compared with other steels, corrosion-resistant steel is used earliest, with low cost, wide performance range, and maximum usage. It is suitable for media such as water, steam, air, hydrogen, ammonia, nitrogen, and petroleum products with a nominal pressure of PN≤32.0 MPa and a temperature of −30-425° C. Common grades include WC1, WCB, ZG25, and high-quality steels 20, 25, 30, and low-alloy structural steel 16 Mn. Therefore, using corrosion-resistant steel to manufacture the groove-type skeleton provided by the cost invention embodiment can improve the strength of the groove-type skeleton.

Seal Lining Structure

The sealing lining structure provided by the present invention includes an airtight layer 3 and at least one groove-type skeleton provided by the present invention. The airtight layer 3 is arranged on the groove-type skeleton through a limit groove formed at the clamping opening with a semi-open accommodating space.

The groove-type skeleton provided by the present invention can embed the airtight layer 3 using the limit groove formed at the clamping opening of the semi-open accommodating space. Since the top edge of at least one side of the clamping opening of the semi-open accommodating space extends inward to form a protrusion, a groove is formed on the inner side corresponding to the protrusion in the clamping opening with a semi-open accommodating space. The protrusion and the groove together form a limit groove. Therefore, it is possible to form a fit between the limit groove formed at the clamping opening of the semi-open accommodating space and the airtight layer 3, thereby avoiding displacement or detachment of the airtight layer 3 and ensuring airtightness. Therefore, it can be formed on the inner side of the concrete lining layer 1 of an underground gas storage to achieve airtight performance of the underground gas storage. Its construction period is shorter than that of welded steel plates, its cost is lower, it has good sealing performance, and it is easy to replace parts and maintain. On the premise of ensuring fastening, its airtightness can meet the requirements of use. The airtight layer 3 has a short construction period and can be prefabricated. Compared with the traditional steel plate lining that requires on-site welding, it can save a lot of construction time and cost, and it can be directly replaced when damaged during maintenance.

The airtight layer 3 is made of a material that can be deformed under pressure. In this case, the characteristics of the airtight layer 3 being deformable under pressure can be utilized to make the fit between the groove-type skeleton and the airtight layer 3 more stable.

The edge of the airtight layer 3 is provided with a fitting part that fits with the limit groove formed at the clamping opening of the semi-open storage space. The airtight layer 3 is arranged on the groove-type skeleton through the fitting part. In this embodiment, the fitting part can be a protrusion that fits with the limit groove formed at the clamping opening of the semi-open storage space, which can make the fit between the airtight layer 3 and the groove-type skeleton better.

The groove-type skeleton includes multiple ones. The multiple groove-type skeletons are arranged in a crisscross pattern, forming a hollow space between them. The airtight layer 3 is arranged in the hollow space through a limit groove formed at the opening of the semi-open containment space. In this case, the airtight layer 3 is arranged between the multiple groove-type skeletons to form a hollow space.

Since the multiple orientations of the airtight layer 3 are fitted with the groove-type skeletons, it can prevent the airtight layer 3 from shifting within the hollow space of the groove-type skeletons, further ensuring the airtightness of the sealed lining structure formed by it. In this embodiment, when the multiple groove-type skeletons are arranged in a crisscross pattern, they are welded together by welding, forming a weld seam 8 between the welded multiple groove-type skeletons.

The sealing lining structure is a sealing lining structure arranged on the inner wall of the cylindrical shape. The groove-type skeleton includes a plurality of axial skeletons and a plurality of circumferential skeletons, which are crisscrossed and connected, forming a hollow space between the groove-type skeletons. The airtight layer 3 is arranged in the hollow space through a limit groove formed at the clamping opening with a semi-open accommodation space. In this case, the groove-type skeleton is equivalent to having a plurality of ribs, which can ensure its own strength. At the same time, there are many hollow spaces formed between the groove-type skeletons, which can further ensure the airtightness of the sealing lining structure formed by it by arranging the airtight layer 3 in it.

Among them, multiple axial skeletons and multiple circumferential skeletons are evenly arranged. In this case, the sealing lining structure formed by them is evenly stressed, and after being installed in the underground gas storage, it can extend the service life of the underground gas storage provided by the embodiment of the present invention.

Underground Gas Storage

The underground gas storage provided by the present invention includes a concrete lining layer 1 and a sealed lining structure provided by the present invention. The inner wall of the concrete lining layer 1 is cylindrical, and the sealed lining structure is fixedly arranged on the inner wall of the concrete lining layer 1 through a fixed base plate 2 of a groove-type skeleton.

The groove-type skeleton provided by the present invention can embed the airtight layer 3 using the limit groove formed at the clamping opening of the semi-open accommodation space it forms. Since the top edge of at least one side of the clamping opening of the semi-open accommodation space extends inward to form a protrusion, a groove is formed on the inner side corresponding to the protrusion in the clamping opening with a semi-open accommodation space. The protrusion and the groove together form a limit groove, so that the limit groove formed at the clamping opening of the semi-open accommodation space can be embedded with the airtight layer 3, thereby avoiding displacement or detachment of the airtight layer 3 and ensuring airtightness. Therefore, it can be formed on the inner side of the concrete lining layer 1 of an underground gas storage to achieve airtight performance of the underground gas storage. Its construction period is shorter than that of welded steel plates, its cost is lower, it has good sealing performance, and its parts are easy to replace and maintain. On the premise of ensuring fastening, its airtightness can meet the requirements of use. The airtight layer 3 has a short construction period and can be prefabricated. Compared with the traditional steel plate lining that requires on-site welding, it can save a lot of construction time and cost, and it can be directly replaced when damaged during maintenance.

The construction method of the underground gas storage provided by the present invention includes the following steps:

Construction Method of Underground Gas Storage

Assembling a groove-type skeleton according to the inner diameter of the underground gas storage, the groove-type skeleton includes multiple axial skeletons and multiple circumferential skeletons, which are crisscrossed and connected to form a hollow space between multiple groove-type skeletons;

laying a groove-type skeleton to the inner wall of the underground gas storage, and fixing the groove-type skeleton to the inner wall of the underground gas storage;

The airtight layer 3 is embedded in the hollowed-out structure through a limit groove formed at the clamping opening with a semi-open accommodation space, so that the inner wall of the underground gas storage reservoir forms a sealed lining structure provided by the present invention.

The groove-type skeleton provided by the present invention can embed the airtight layer 3 using the limit groove formed at the clamping opening of the semi-open accommodation space it forms. Since the top edge of at least one side of the clamping opening of the semi-open accommodation space extends inward to form a protrusion, a groove is formed on the inner side corresponding to the protrusion in the clamping opening with a semi-open accommodation space. The protrusion and the groove together form a limit groove, so that the limit groove formed at the clamping opening of the semi-open accommodation space can be embedded with the airtight layer 3, thereby avoiding displacement or detachment of the airtight layer 3 and ensuring airtightness. Therefore, it can be formed on the inner side of the concrete lining layer 1 of an underground gas storage to achieve airtight performance of the underground gas storage. Its construction period is shorter than that of welded steel plates, its cost is lower, it has good sealing performance, and its parts are easy to replace and maintain. On the premise of ensuring fastening, its airtightness can meet the requirements of use. The airtight layer 3 has a short construction period and can be prefabricated. Compared with the traditional steel plate lining that requires on-site welding, it can save a lot of construction time and also has lower costs. During maintenance, it is easy to replace damaged parts directly.

Wherein, laying the grooved skeleton to the inner wall of the underground gas storage and fixing the grooved skeleton to the inner wall of the underground gas storage specifically include the following steps:

drilling a first type of connection hole on the inner wall of the underground gas storage;

adjusting the position of the groove-type skeleton so that the second connection hole of the groove-type skeleton corresponds to the position of the first connection hole on the inner wall of the underground gas storage;

Simultaneously screw the set bolt 4 into the first type of connection hole and the second type of connection hole, so that the groove-type skeleton is fixed to the inner wall of the underground gas storage.

In this case, the sealing lining structure can be stably fixed to the inner wall of the concrete lining layer 1 of the underground gas storage through the first connection hole, the second connection hole, and the set bolt 4, and the cost is low.

Among them, after embedding the airtight layer 3 in the hollow inner wall through the limit groove formed at the clamping opening with a semi-open accommodation space, so that the inner wall of the underground gas storage forms a sealed lining structure provided by the present invention, the following steps are also included:

Conduct gas storage tests in underground gas storage facilities to determine their sealing performance;

Real-time monitoring is conducted for potential gas leakage points in underground gas storage.

In this case, real-time monitoring of possible leakage points in underground gas storage can be carried out to detect and remedy any leakage in a timely manner.

Among them, during the process of real-time monitoring for possible leakage points in underground gas storage, the possible leakage points include: the connection between the airtight layer 3 and the groove-type skeleton, the connection between the groove-type skeleton and the umbrella-shaped part, the connection between the fixed chassis of the groove-type skeleton and the inner wall of the underground gas storage, and one or more parts of the airtight layer 3 itself. In this case, it is possible to accurately monitor the possible leakage points in the underground gas storage in real time.

The real-time monitoring of possible leakage points in underground gas storage facilities includes the following steps:

Gas flow monitoring instruments are installed at potential gas leakage points in underground gas storage facilities, and location tags are assigned to each instrument;

Based on the location of the gas flow monitoring instrument, set the alarm threshold for the gas flow monitoring instrument;

When there is an abnormal gas flow alarm, the location of the gas leakage point in the underground gas storage tank can be determined based on the location label of the gas flow monitoring instrument that triggered the alarm.

In this case, once the possible leakage point of the underground gas storage leaks, the leakage point of the underground gas storage can be accurately determined based on the alarm information and the location label of the gas flow monitoring instrument, so that emergency repair measures can be taken.

Grooved Shaped Part

Referring to FIGS. 7 to 14, the groove-type shaped part 2 provided in the embodiment of the present invention is annular, and the groove-type shaped part 2 includes a fixed base plate. After the groove-type shaped part 2 is cut and expanded along the axis direction, the fixed base plate has a length direction and a width direction, The fixed base plate 2 has a length direction and a width direction. Along the length direction, the fixed base plate 2 forms a clamping opening with a semi-open accommodation space at the central axis. The top edge of at least one side of the clamping opening with a semi-open accommodation space extends inward to form a protrusion, so that a groove is formed on the inner side corresponding to the protrusion in the clamping opening with a semi-open accommodation space. The protrusion and the groove together form a limit groove.

The groove-type molding member provided by the present invention can embed the airtight layer 3 by using the limit groove formed at the nip of the semi-open accommodation space formed by it. The top edge of at least one side of the nip of the semi-open accommodation space extends inward to form a protrusion, so that a groove is formed on the inner side corresponding to the protrusion in the nip of the semi-open accommodation space. The protrusion and the groove together form a limit groove, so that the limit groove formed at the nip of the semi-open accommodation space can be embedded with the airtight layer 3, thereby avoiding displacement or detachment of the airtight layer 3 and ensuring airtightness. Therefore, it can be formed on the inner side of the concrete lining layer 1 of an underground gas storage to achieve airtight performance of the underground gas storage. Its construction period is shorter than that of welding steel plates, its cost is lower, it has good sealing performance, and its parts are easy to replace and maintain. On the premise of ensuring its fastening, its airtightness can meet the use requirements. Since the groove-type molding member 2 is circular, it can ensure that the underground chamber lining is always circular and isotropic. In addition, the airtight layer 3 has a short construction period and its components can be prefabricated. Compared with the traditional steel plate lining that requires on-site welding, it can save a lot of construction time and its cost will be lower. During maintenance, it is only necessary to replace the damaged parts directly.

Among them, the thickness of the fixed bottom plate 2 at the middle axis along the length direction is greater than the thickness of the two sides of the fixed bottom plate 2, so that the center of the radial cross-section of the fixed bottom plate 2 rises and gradually decreases in thickness towards both sides. In this case, due to the rise in the center of the radial cross-section of the fixed bottom plate 2, the depth of the limit groove can be increased, and the fitting force between the fixed bottom plate 2 and the airtight layer 3 increases, so that the fitting force between the fixed bottom plate 2 and the airtight layer 3 is more stable.

Among them, the fixed base plate 2 is in an axisymmetric structure with the central axis along the length direction as the axis of symmetry, and the top edges on both sides of the semi-open accommodation space have protrusions extending inwardly, forming grooves corresponding to the protrusions on the inner side of the semi-open accommodation space. The protrusions and corresponding side grooves form limit grooves. In this case, both sides of the semi-open accommodation space can form a fitting force with a gas-tight layer 3, enabling the groove-type shaped piece provided by the embodiment of the present invention to be formed in the middle part of the sealed lining structure, while the single-sided limit groove can only be applied to the edge part of the sealed lining structure.

The groove-type shaped part 2 is made of corrosion-resistant steel. The carbon content is less than 2.11%, and it contains no other alloying elements except for iron, carbon, and impurities such as silicon, manganese, phosphorus, and sulfur within the limit. The carbon content of industrial carbon steel is generally 0.05% to 1.35%. The performance of corrosion-resistant steel mainly depends on the carbon content. As the carbon content increases, the strength and hardness of the steel increase, while the plasticity, toughness, and weldability decrease. Compared with other steels, corrosion-resistant steel is used earliest, with low cost, wide performance range, and the largest amount. It is suitable for media such as water, steam, air, hydrogen, ammonia, nitrogen, and petroleum products with a nominal pressure of PN≤32.0 MPa and a temperature of −30-425° C. Common grades include WC1, WCB, ZG25, and high-quality steels 20, 25, 30, and low-alloy structural steel 16 Mn. Therefore, using corrosion-resistant steel to manufacture the groove-type shaped part 2 provided in the embodiment of the present invention can improve the strength of the groove-type shaped part 2.

The annular groove-type molding piece 2 is integrally formed, or the groove-type molding piece 2 includes multiple groove-type molding components that are assembled from the width direction to form the annular groove-type molding piece 2. When the annular groove-type molding piece 2 is integrally formed, it has no connecting joints, which not only avoids stress concentration but also prevents breakage from the connecting joints, thereby improving the service life of the annular groove-type molding piece 2. When the annular groove-type molding piece 2 is formed by connecting multiple groove-type molding components from the width direction, it is more convenient to assemble them on the inner wall of the underground chamber. In practice, it can be selected according to the needs. In this embodiment, multiple groove-type molding components are connected and assembled from the width direction to form the annular groove-type molding piece 2 by welding, forming a weld seam 5.

Seal Lining Structure

The sealing lining structure provided by the present invention includes an airtight layer 3 and at least one groove-type molding part 2 provided by the present invention. The airtight layer 3 is disposed on the groove-type molding part 2 through a limit groove formed at the clamping opening with a semi-open accommodation space.

The groove-type molding member provided by the present invention can embed the airtight layer 3 by using the limit groove formed at the nip of the semi-open receiving space formed by it. The top edge of at least one side of the nip of the semi-open receiving space extends inward to form a protrusion, so that a groove is formed on the inner side corresponding to the protrusion in the nip of the semi-open receiving space. The protrusion and the groove together form a limit groove. Therefore, the limit groove formed at the nip of the semi-open receiving space can be embedded with the airtight layer 3, thereby avoiding displacement or detachment of the airtight layer 3 and ensuring airtightness. Therefore, it can be formed on the inner side of the concrete lining layer 1 of an underground gas storage to achieve airtight performance of the underground gas storage. Its construction period is shorter than that of welding steel plates, and its cost is lower. It has good sealing performance and is easy to maintain due to its convenient replacement of parts. Under the premise of ensuring its fastening, its airtightness can meet the use requirements. Since the groove-type molding member 2 is circular, it can ensure that the underground chamber lining is always circular and isotropic. In addition, the airtight layer 3 has a short construction period and components can be prefabricated. Compared with the traditional steel plate lining that requires on-site welding, it can save a lot of construction time and cost, and can directly replace damaged parts during maintenance.

The airtight layer 3 is made of a material that can be deformed under pressure. In this case, the airtight layer 3 can be deformed under pressure, which can enhance the stability of the fit between the groove-type molding piece 2 and the airtight layer 3.

Among them, the edge of the airtight layer 5 is provided with a fitting part that fits with the limit groove formed at the clamping opening of the semi-open storage space. The airtight layer 5 is arranged on the groove-type molding piece 2 through the fitting part. In this embodiment, the fitting part can be a protrusion that fits with the limit groove formed at the clamping opening of the semi-open storage space, which can make the fit between the airtight layer 3 and the groove-type molding piece 2 better.

The sealing lining structure is a sealing lining structure arranged on the inner wall of the cylindrical shape, and the groove-type molding member 2 includes a plurality of annular frame-type molding members. The centers of the plurality of annular frame-type molding members are coaxial, and the plurality of annular groove-type molding members 2 are connected as a whole through the airtight layer (3). The airtight layer 3 is connected to the groove-type molding members 2 through a limit groove formed at the clamping opening with a semi-open receiving space, so that the sealing lining structure becomes a cylindrical sealing lining structure. In this case, the airtight layer 3 is arranged between the plurality of annular groove-type molding members 2 to form a hollow, and since the airtight layer 3 is fitted between the groove-type molding members 2 in multiple orientations, it can prevent the airtight layer 3 from shifting between the groove-type molding members 2, further ensuring the airtightness of the sealing lining structure formed by it. In addition, the plurality of annular groove-type molding members 2 are equivalent to having multiple ribs, which can ensure their own strength, thus reducing the possibility of deformation of the sealing lining structure and extending its service life.

Among them, a plurality of annular groove-type shaping members 2 are evenly arranged along the axial direction of the cylindrical sealing lining mechanism. In this case, the sealing lining formed by them is evenly stressed, and after being installed in the underground chamber, it can extend the service life of the underground chamber provided by the embodiment of the present invention.

Underground Chamber

The underground chamber provided by the present invention includes a concrete lining layer 1 and a sealing lining structure provided by the present invention. The inner wall of the concrete lining layer 1 is cylindrical, and the sealing lining structure is fixedly arranged on the inner wall of the concrete lining layer 1 through a fixed base plate of a groove-type molding piece 2.

The groove-type shaped part provided by the present invention can embed the airtight layer 3 using the limit groove formed at the clamping opening of the semi-open accommodation space formed by it. The top edge of at least one side of the clamping opening of the semi-open accommodation space extends inward to form a protrusion, so that a groove is formed on the inner side corresponding to the protrusion in the clamping opening with a semi-open accommodation space. The protrusion and the groove together form a limit groove, so that the fit between the limit groove formed at the clamping opening of the semi-open accommodation space and the airtight layer 3 can be formed, thereby avoiding displacement or detachment of the airtight layer 3 and ensuring airtightness. Therefore, it can be formed on the inner side of the concrete lining layer 1 of an underground gas storage to achieve airtight performance of the underground gas storage. Its construction period is shorter than that of welding steel plates, and its cost is lower. It has good sealing performance and is easy to maintain due to convenient replacement of parts. On the premise of ensuring fastening, its airtightness can meet the requirements of use. Since the groove-type shaped part 2 is annular, it can ensure that the underground chamber lining is always annular and isotropic. In addition, the airtight layer 3 has a short construction period and components can be prefabricated. Compared with the traditional steel plate lining that requires on-site welding, it can save a lot of construction time and at the same time, its cost will be lower. During maintenance, it is only necessary to replace the damaged parts directly.

Construction Method of Underground Cavern

The construction method for underground chambers provided by the present invention includes the following steps:

According to the inner diameter of the underground chamber, a circular groove-type shaped part 2 is fixedly arranged on the inner wall of the underground chamber, so that the outer diameter of the circular groove-type shaped part 2 is adapted to the inner diameter of the underground chamber;

The airtight layer 3 is embedded in the annular groove-shaped shaped piece 2 through a limit groove formed at the clamping opening with a semi-open receiving space, so that the inner wall of the underground chamber forms a sealed lining structure provided by the present invention.

The groove-type shaped part provided by the present invention can embed the airtight layer 3 using the limit groove formed at the clamping opening of the semi-open accommodating space. Since the top edge of at least one side of the clamping opening of the semi-open accommodating space extends inward to form a protrusion, a groove is formed on the inner side corresponding to the protrusion in the clamping opening with a semi-open accommodating space. The protrusion and the groove together form a limit groove, so that the limit groove formed at the clamping opening of the semi-open accommodating space can be embedded with the airtight layer 3, thereby avoiding displacement or detachment of the airtight layer 3 and ensuring airtightness. Therefore, it can be formed on the inner side of the concrete lining layer 1 of an underground gas storage to achieve airtight performance of the underground gas storage. Its construction period is shorter than that of welded steel plates, and its cost is lower. It has good sealing performance and is easy to maintain due to convenient replacement of parts. On the premise of ensuring fastening, its airtightness can meet the requirements of use. Since the groove-type shaped part 2 is annular, it can ensure that the underground chamber lining is always annular and isotropic. In addition, the airtight layer 3 has a short construction period and components can be prefabricated. Compared with the traditional steel plate lining that requires on-site welding, it can save a lot of construction time and at the same time, its cost will be lower. During maintenance, it is only necessary to replace the damaged parts directly.

Among them, according to the inner diameter of the underground chamber, the fixing and arranging of the annular groove-type shaped parts 2 on the inner wall of the underground chamber in a fixed manner so that the annular groove-type shaped parts 2 are compatible with the inner wall of the underground chamber specifically includes the following steps:

- drilling a first type of connection hole on the inner wall of the underground chamber;
- adjusting the position of the groove-type shaped part 2 so that the second connection hole of the groove-type shaped part 2 corresponds to the position of the first connection hole on the inner wall of the underground chamber;

Simultaneously screw the set bolt 4 into the first type of connection hole and the second type of connection hole, so that the groove-type shaped part 2 is fixed to the inner wall of the underground chamber.

In this case, the sealing lining structure can be stably fixed to the inner wall of the concrete lining layer 1 of the underground chamber through the first connection hole, the second connection hole, and the set bolt 4, and the cost is low.

Among them, after embedding the airtight layer 3 in the hollowed-out space through the limit groove formed at the clamping opening with a semi-open accommodation space, so that the inner wall of the underground chamber forms a sealed lining structure provided by the present invention, the following steps are also included:

Conduct gas storage tests in underground chambers to determine their sealing performance;

Real-time monitoring is conducted for possible gas leakage points in underground caverns.

In this case, real-time monitoring of possible gas leakage points in underground caverns can be carried out to detect and remedy any gas leakage in a timely manner.

In the process of real-time monitoring for possible gas leakage points in the underground chamber, the possible gas leakage points include: the connection between the airtight layer 3 and the groove-type molding part 2, the connection between the groove-type molding part 2 and the umbrella-shaped part, the connection between the fixed chassis of the groove-type molding part 2 and the inner wall of the underground chamber, and one or more parts of the airtight layer 3 itself. In this case, it is possible to accurately monitor the possible gas leakage points in the underground chamber in real time.

Among them, real-time monitoring of possible gas leakage points in underground caverns includes the following steps:

- Gas flow monitoring instruments shall be installed at potential gas leakage points in underground chambers, and location labels shall be provided for each gas flow monitoring instrument;
- Based on the location of the gas flow monitoring instrument, set the alarm threshold for the gas flow monitoring instrument;
- When there is an abnormal gas flow alarm, the location of the gas leakage point in the underground chamber can be determined based on the location label of the gas flow monitoring instrument that triggered the alarm.

In this case, once the possible leakage point of the underground chamber leaks, the leakage point of the underground chamber can be accurately determined based on the alarm information and the location label of the gas flow monitoring instrument, so that emergency repair measures can be taken.

Dome Sealing Lining Structure of Underground Rock Lining Tunnel with Hook Plate

Figure 15:
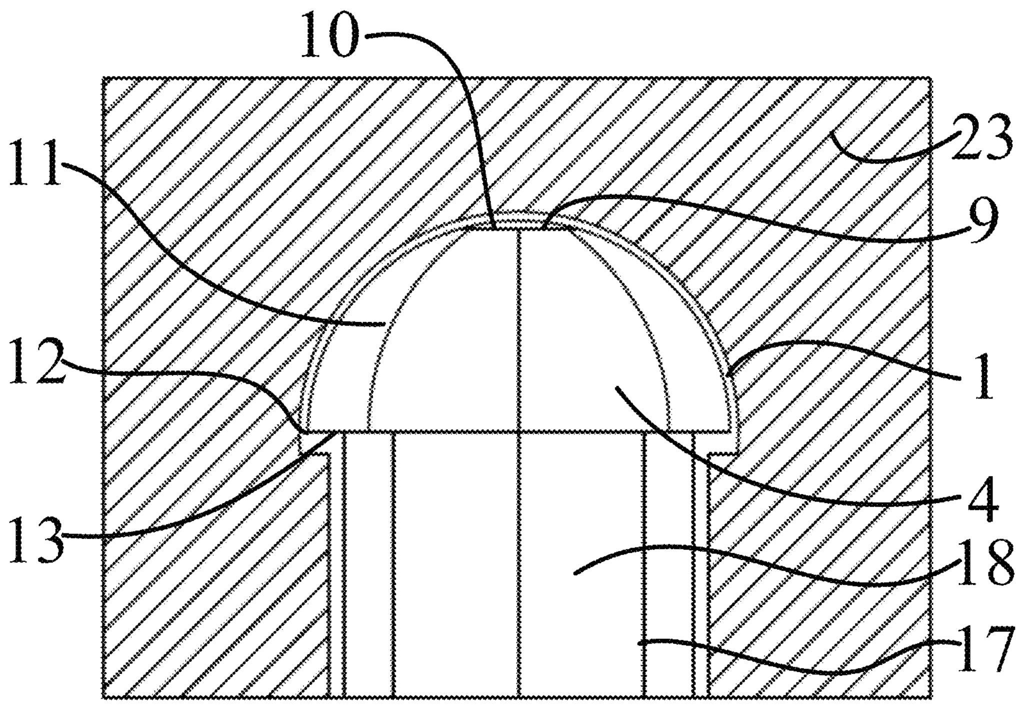
FIG. 15 is a sectional view of the relationship between the sealed underground rock lining structure of the dome sealing lining structure of the hook plate type underground rock lining chamber provided by an embodiment of the present invention, the concrete lining, and the surrounding rock structure.
Figure 16:
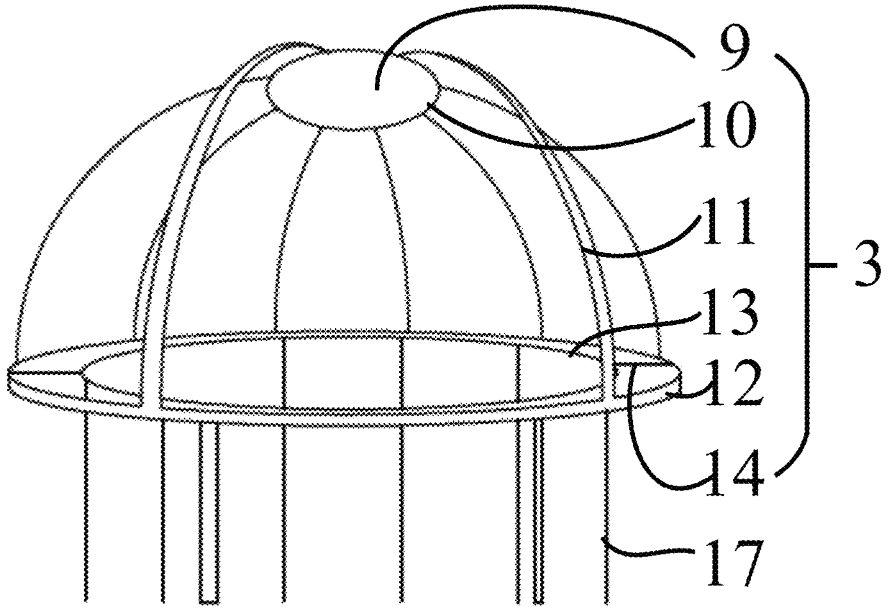
FIG. 16 is a three-dimensional schematic diagram of the combined dome sealing lining structure of the sealing tunnel provided by the embodiment of the invention, which is involved in the dome sealing lining structure of the hook plate type underground rock lining tunnel.
Figure 17:
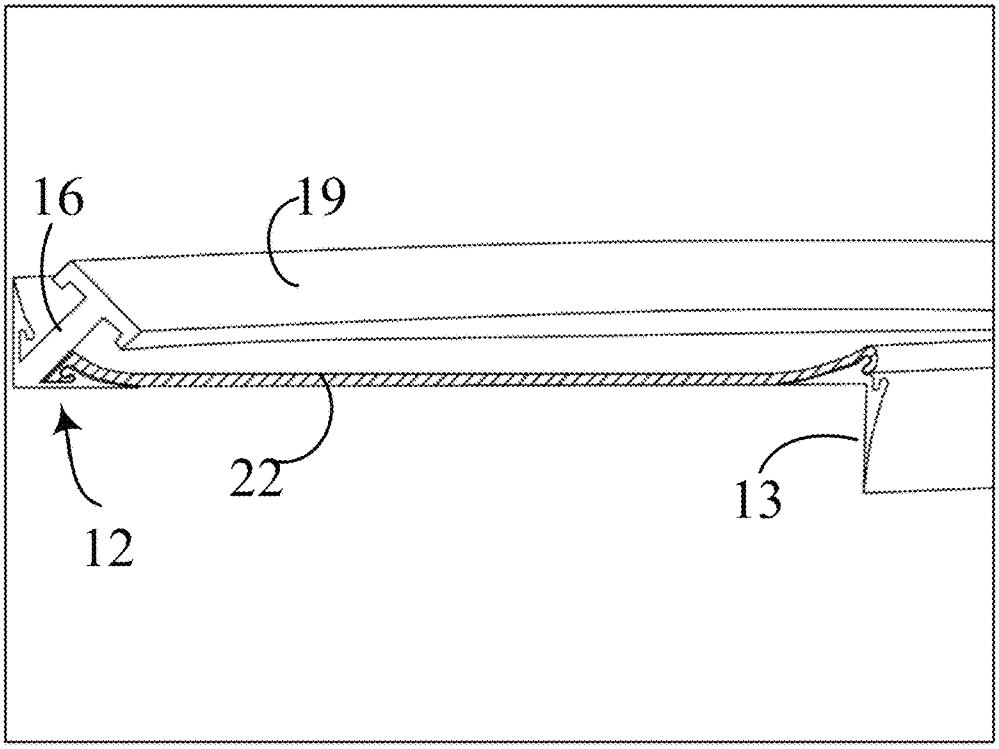
FIG. 17 is an axial sectional view of the sealed underground cave ring operating platform involved in the dome sealing lining structure of the hook plate type underground rock lining cave provided by an embodiment of the present invention.
Figure 18:
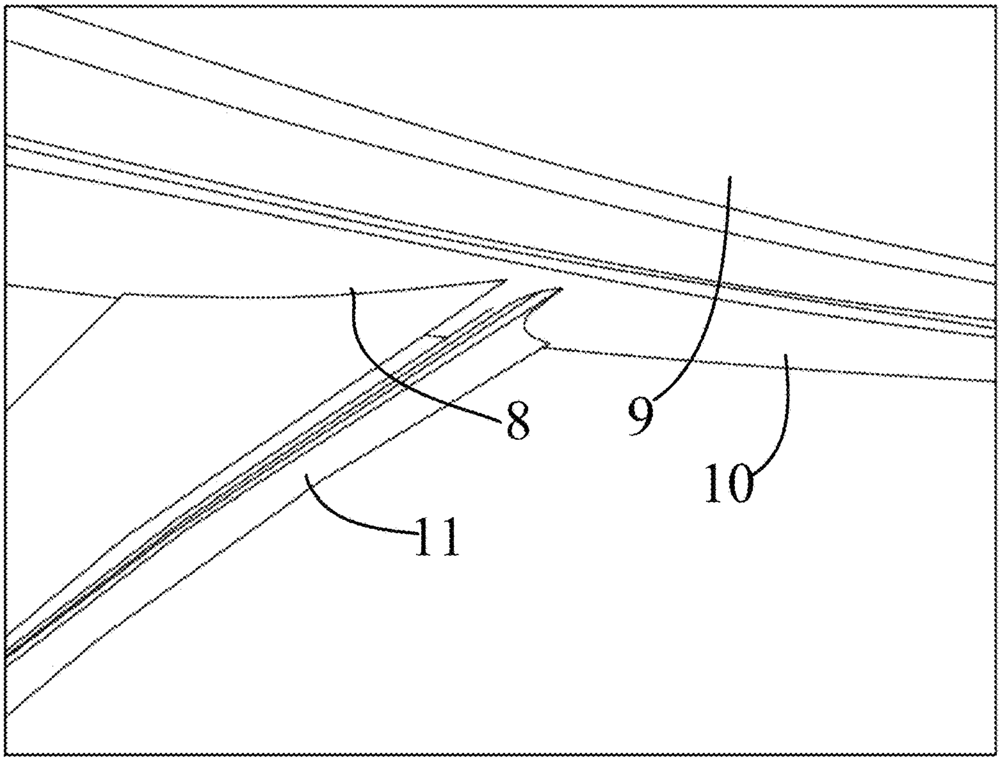
FIG. 18 is an axial sectional view of the spherical shell-shaped plate of the sealed vault of the dome-shaped underground rock lining vault provided by the embodiment of the invention, which is involved in the sealing vault dome lining structure.
Figure 19:
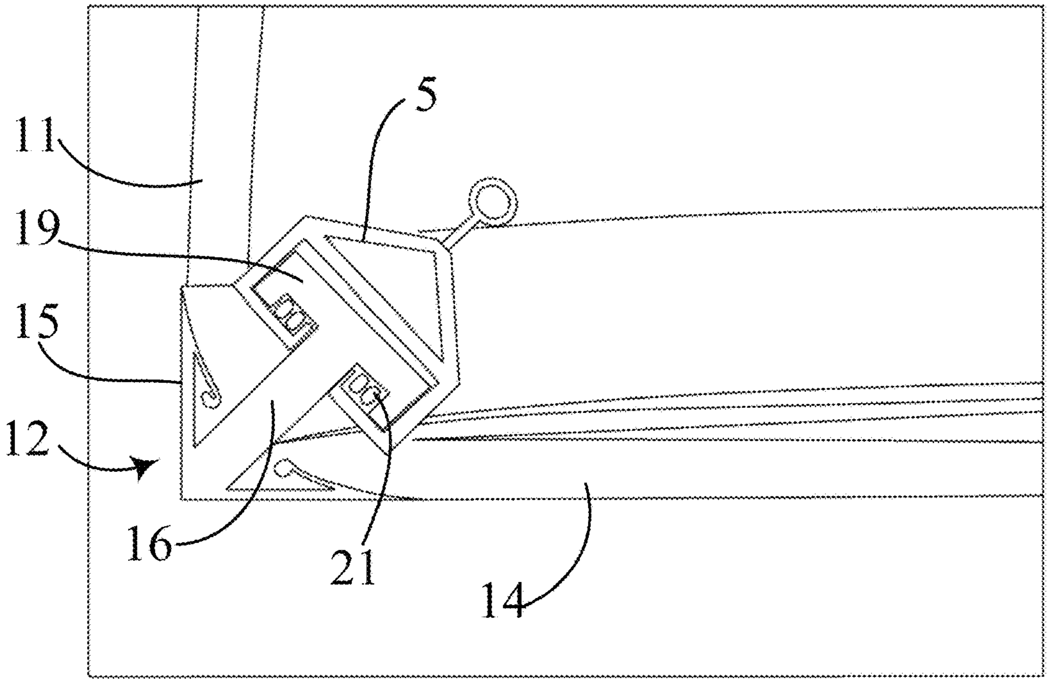
FIG. 19 is a schematic diagram of the connection between the sliding safety lock connection device and the outer ring skeleton involved in the dome sealing lining structure of the hook plate type underground rock lining chamber provided by an embodiment of the present invention.
Figure 20:
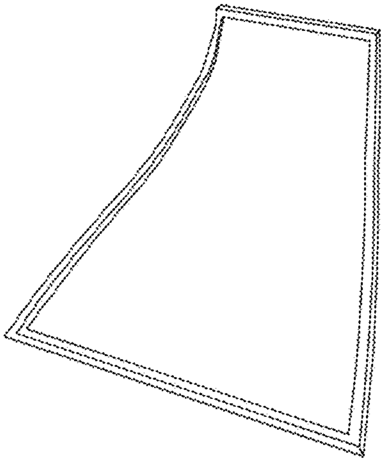
FIG. 20 is a three-dimensional schematic diagram of the fan-ring airtight layer involved in the dome sealing lining structure of the hook plate underground rock lining cavern provided by an embodiment of the present invention.
Figure 21:
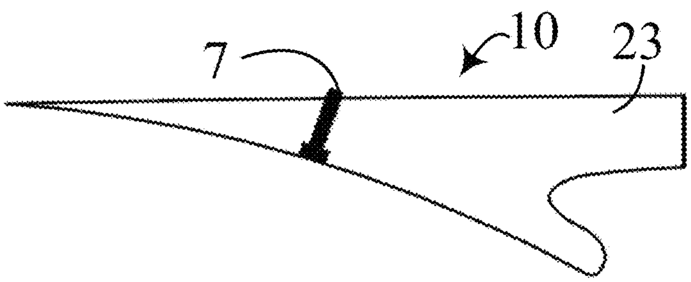
FIG. 21 is a radial sectional view of a first hook plate type connecting piece involved in the dome sealing lining structure of the hook plate type underground rock lining chamber provided by an embodiment of the present invention.
Figure 22:
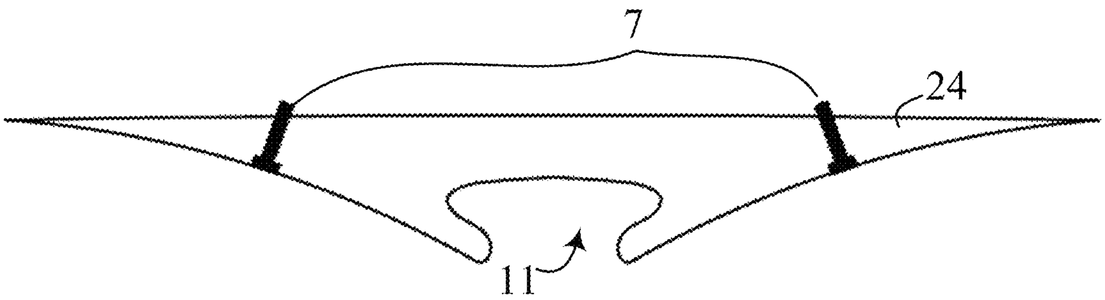
FIG. 22 is a radial sectional view of a second hook plate type connecting piece involved in the dome sealing lining structure of the hook plate type underground rock lining cavern provided by an embodiment of the present invention.
Figure 23:
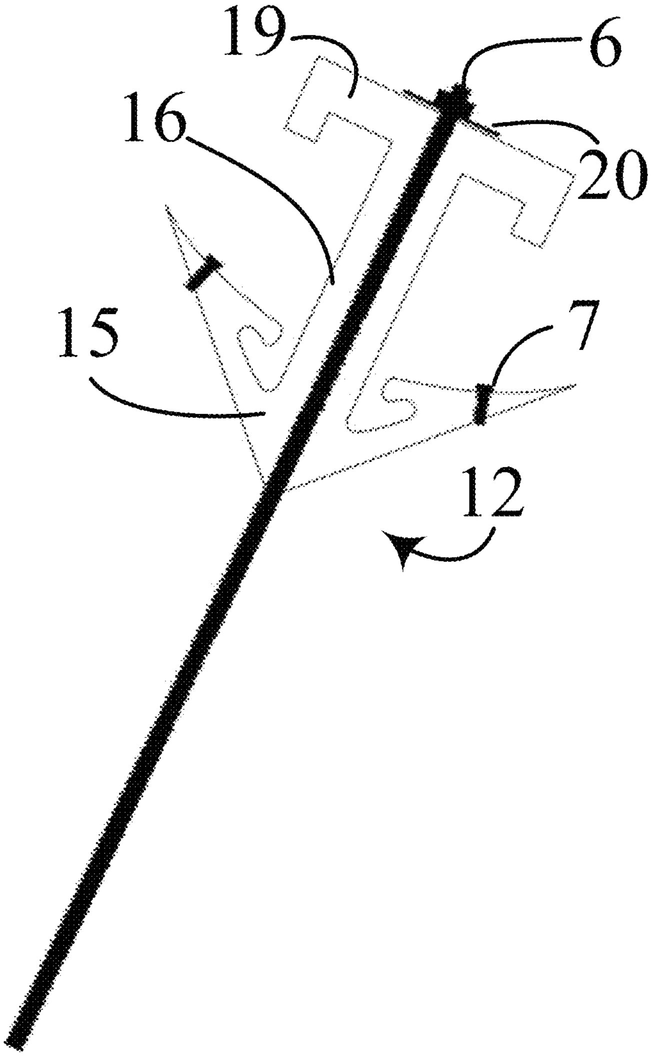
FIG. 23 is a radial sectional view of a third hook plate type connecting piece involved in the dome sealing lining structure of the hook plate type underground rock lining chamber provided by an embodiment of the present invention.
Figure 24:
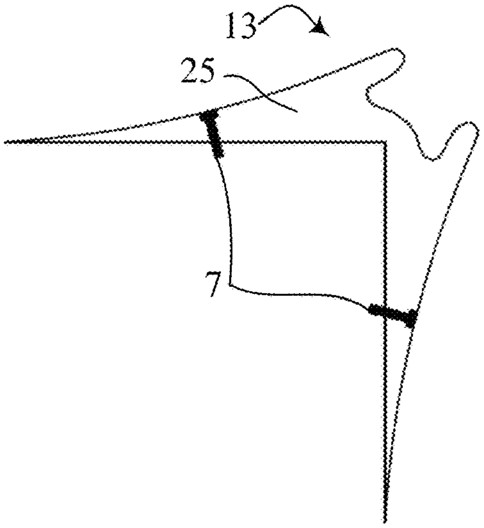
FIG. 24 is a radial sectional view of a fourth hook plate type connecting piece involved in the dome sealing lining structure of the hook plate type underground rock lining cavern provided by an embodiment of the present invention.
Figure 25:
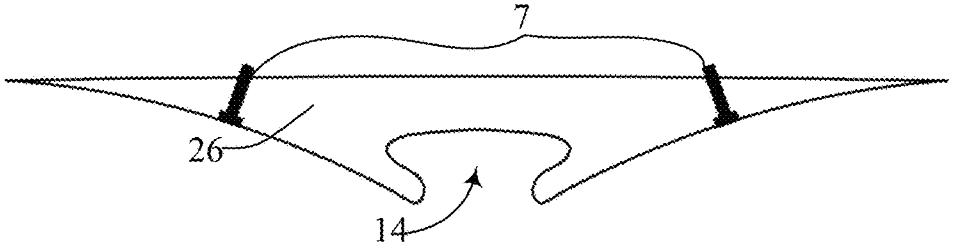
FIG. 25 is a radial sectional view of a fifth hook plate type connecting piece involved in the dome sealing lining structure of the hook plate type underground rock lining cavern provided by an embodiment of the present invention.
Figure 26:
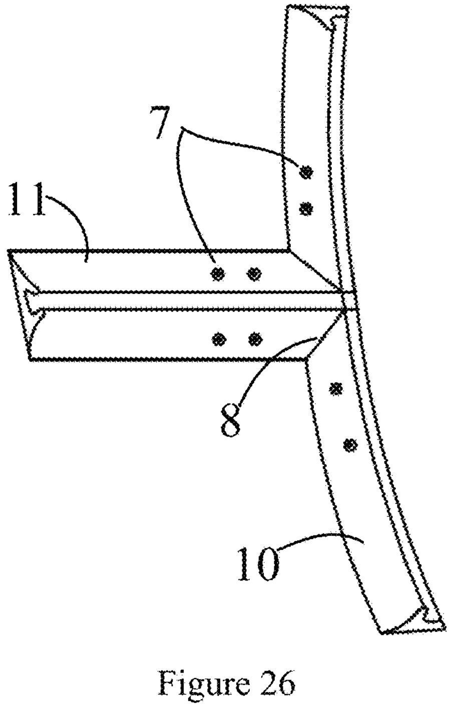
FIG. 26 is a sectional view of the connection between the ring skeleton and the arc skeleton involved in the dome sealing lining structure of the hook plate type underground rock lining cavern provided by an embodiment of the present invention.
Figure 27:
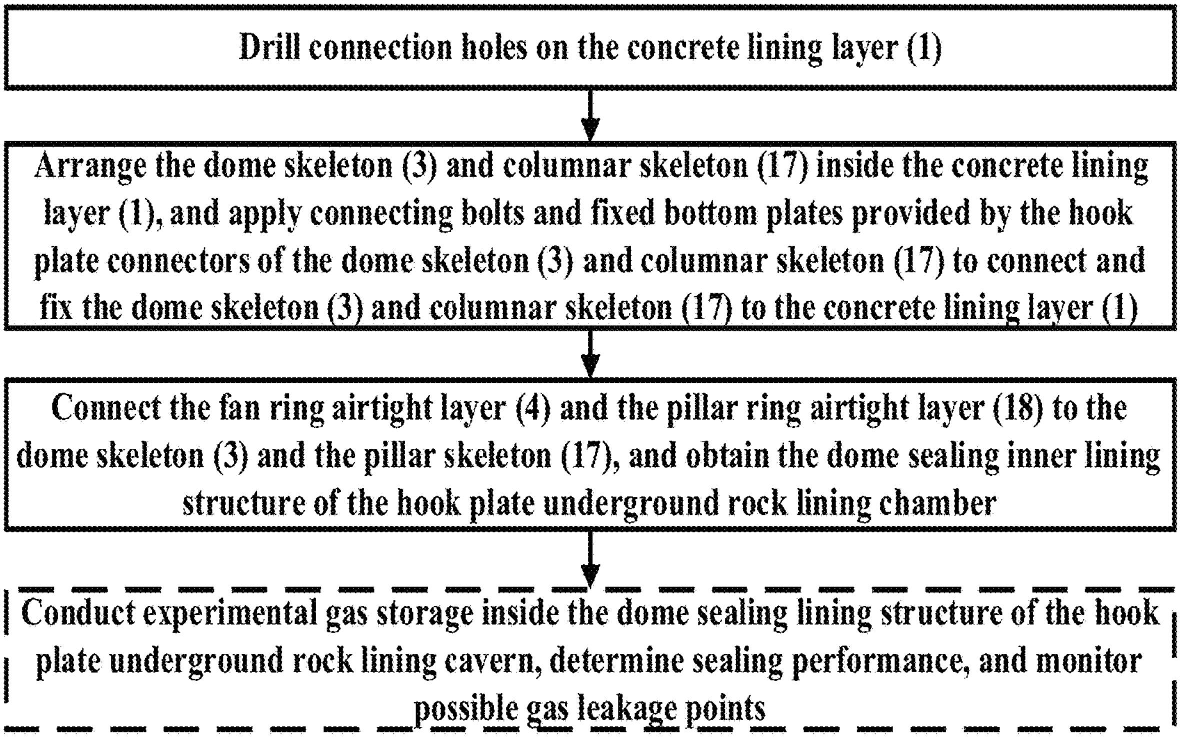
FIG. 27 is a flowchart of the construction method for the dome sealing lining structure of the hook plate type underground rock lining cavern provided by an embodiment of the present invention.

Referring to FIGS. 15 and 27, an embodiment of the present invention provides a dome sealed inner lining structure for a hook plate underground rock lining chamber. The hook plate underground rock lining chamber is set inside the surrounding rock 23, and a concrete lining layer 1 is set between the hook plate underground rock lining chamber and the surrounding rock 23. Among them, the dome sealing inner lining structure of the hook plate underground rock lining chamber includes a dome skeleton 3, a columnar skeleton 17, a fan ring airtight layer 4, and a columnar ring airtight layer 18. The dome skeleton 3 and the columnar skeleton 17 respectively provide hook plate connectors. The columnar skeleton 17 is fixedly connected to the bottom of the dome skeleton 3 through hook plate connectors; The fan ring airtight layer 4 is fixedly connected between the dome skeleton 3 through a hook plate connector, and the column ring airtight layer 18 is fixedly connected between the column skeleton 17 through a hook plate connector, so that the fan ring airtight layer 4 and the column ring airtight layer 18 together form the dome sealing inner lining structure of the underground rock lined cavern.

The dome sealing inner lining structure of the hook plate underground rock lining cave provided by the implementation example of the present invention does not require the provision of an overall sealing inner lining structure in the concrete lining layer 1 during the construction process. Instead, a skeleton is first laid in the concrete lining layer 1, and the airtight layer is connected between the skeletons, ultimately forming the dome sealing inner lining structure of the underground rock lining cave. Compared to the overall sealing layer, the installation is more convenient, the work efficiency is higher, and the cost is lower.

Among them, the dome skeleton 3 includes a spherical shell plate 9, a circular skeleton 10, multiple arc-shaped skeletons 11, an outer ring skeleton 12, an inner ring skeleton 13, a radial skeleton 14, and a circular platform 22. The inner diameter of the annular skeleton 10 is equal to the diameter of the spherical shell plate 9, and the annular skeleton 10 is fixed at the outer ring of the spherical shell plate 9; The diameter of the outer ring skeleton 12 is greater than the diameter of the inner ring skeleton 13, and the diameter of the inner ring skeleton 13 is greater than the diameter of the spherical shell plate 9; One end of the arc-shaped skeleton 11 is fixedly connected to the annular skeleton 10, and the other end of the arc-shaped skeleton 11 is fixedly connected to the outer ring skeleton 12; One end of the radial skeleton 14 is fixedly connected to the outer ring skeleton 12, and the other end of the radial skeleton 14 is fixedly connected to the inner ring skeleton 13, forming a circular belt between the outer ring skeleton 12 and the inner ring skeleton 13; The annular platform 22 is located within the annular belt, wherein it is fixedly connected between the outer ring skeleton 12, the inner ring skeleton 13, and the radial skeleton 14 through a hook plate connector; One end of the columnar skeleton 17 is fixedly connected to the inner ring skeleton 13; The spherical plate 9 is sealed in the construction shaft. In this case, the dome skeleton 3 is easy to form, and the connection reliability is high when connected to the dome skeleton 3 using hook plate connectors.

Among them, the hook plate connector includes a first hook plate connector, a second hook plate connector, a third hook plate connector, a fourth hook plate connector, and a fifth hook plate connector. The first hook plate type connector is set at the connection between the annular skeleton 10 and the fan-shaped airtight layer 4; The second hook plate type connector is set at the connection between the arc-shaped skeleton 11 and the fan-shaped airtight layer 4; The third hook plate type connector is set at the connection between the outer ring skeleton 12, the fan ring type airtight layer 4, and the annular platform 22; The fourth hook plate type connector is set at the connection between the annular platform 22 and the column ring type airtight layer 18; The fifth hook plate connector is set at the connection between the column ring airtight layer 18 and the column shaped skeleton 17. In this case, different forms of hook plate connectors can be set according to the specific situation of different connection parts, which has better adaptability.

Among them, the first hook plate connector includes a first fixed bottom plate 23. The first fixed bottom plate 23 has a length direction and a width direction. On one side of the first fixed bottom plate 23 along the length direction, there is a clamp with a semi open capacity space. The top edge of the clamp with a semi open capacity space extends inward to form a protrusion, so that within the clamp with a semi open capacity space, a groove is formed on the inner side corresponding to the protrusion, and the protrusion and groove together form a limit groove. In this case, the fan-shaped airtight layer 4 can be connected to the annular skeleton 10 using the semi open capacity space clamp, with high connection reliability.

Among them, the second hook plate type connector includes a second fixed bottom plate 24. The second fixed bottom plate 24 has a length direction and a width direction. Along the length direction, the second fixed bottom plate 24 forms a clamp with a semi open storage space at the middle axis. The top edges on both sides of the clamp with a semi open storage space extend inward to form protrusions, so that within the clamp with a semi open storage space, grooves are formed on the inner side corresponding to the protrusions, and the protrusions and grooves together form a limit groove. In this case, the fan-shaped airtight layer 4 can be connected to the arc-shaped skeleton 11 using the semi open capacity space clamp, with high connection reliability.

Among them, the fifth hook plate connector includes the fifth fixed bottom plate 26. The fifth fixed bottom plate 26 has a length direction and a width direction. Along the length direction, the fifth fixed bottom plate 26 forms a clamp with a semi open storage space at the middle axis. The top edges on both sides of the clamp with a semi open storage space extend inward to form protrusions, so that within the clamp with a semi open storage space, grooves are formed on the inner side corresponding to the protrusions, and the protrusions and grooves together form a limit groove. In this case, the column ring airtight layer 27 can be connected to the columnar skeleton 26 using the semi open capacity space clamp, with high connection reliability.

Among them, the fourth hook plate connector includes the fourth fixed bottom plate 25. From the radial section of the fourth fixed bottom plate 25, it can be observed that the fourth fixed bottom plate 25 forms a clamp with a semi open storage space at the symmetrical axis. The top edges on both sides of the clamp with a semi open storage space extend inward to form protrusions, so that within the clamp with a semi open storage space, grooves are formed on the inner side corresponding to the protrusions, and the protrusions and grooves together form a limit groove; Among them, the fourth fixed bottom plate 25 has a folding angle facing away from the clamping direction of the semi open storage space, and two connecting wings are formed at the two folding angles of the fourth fixed bottom plate 25. In this case, the column ring airtight layer 27 can be connected to the annular platform 2 using the semi open capacity space clamp, with high connection reliability.

Among them, the third hook plate connector includes a third fixed bottom plate 15. From the radial section of the third fixed bottom plate 15, it can be observed that a clamp with a semi open storage space is formed at the symmetrical axis of the third fixed bottom plate 15. The top edges on both sides of the clamp with a semi open storage space extend inward to form protrusions, so that within the clamp with a semi open storage space, grooves are formed on the inner side corresponding to the protrusions, and the protrusions and grooves together form limit grooves. Among them, the third fixed bottom plate 15 has a folding angle towards the direction close to the third hook plate, forming two connecting wings at the two folding angles of the third fixed bottom plate 15. In this case, the fan-shaped airtight layer 4 and the annular platform 2 can be connected to the outer ring skeleton 12 using the semi open capacity space clamp, with high connection reliability.

Among them, the dome sealing lining structure of the hook plate underground rock lining cave also includes an extension 16 and a sliding safety lock 5. The extension portion 16 extends towards the distal end from the symmetrical axis of the third fixed bottom plate 15. The sliding safety lock buckle 5 includes a first connecting portion and a second connecting portion. The sliding safety lock buckle 5 is set on the extension portion 16 through the first connecting portion, so that the sliding safety lock buckle 5 can slide along the extension portion 16. One end of the second connecting portion is fixedly connected to the first connecting portion, and the other end of the second connecting portion is used to externally connect accessory components. In this case, the extension 16 and the sliding safety lock 5 can be used to connect the accessory components externally. In this embodiment, the accessory components include a construction basket, making the construction process more convenient.

Among them, the dome sealing inner lining structure of the hook plate underground rock lining cavern also includes a limiting member 19 and a roller 21. The limiting member 19 is fixedly set at the end of the extension portion 19, and the first connecting part of the sliding safety lock 5 is equipped with a box structure. The box structure is embedded with the limiting member 19, forming a storage space between the box structure and the limiting member 19. The roller 21 is set within the storage space, and the rolling direction of the roller 21 is consistent with the sliding direction of the sliding safety lock 5. In this case, using roller 31, the sliding friction force during the sliding process of sliding safety lock 5 can be converted into rolling friction force, making sliding more convenient.

Among them, the contour size of roller 21 matches the size of the storage space. In this case, it is possible to prevent the sliding safety latch 5 from tilting during the sliding process.

Among them, the dome sealing lining structure of the hook plate underground rock lining cave also includes anchor rod 6 and gasket 20. Anchor rod 6 penetrates through extension 16, and is fixed with a nut to secure the other end of anchor rod 6 to the interior of surrounding rock 23. Shim 20 is set between limit member 19 and the nut, where the inner diameter of Shim 20 is greater than the diameter of anchor rod 6 but less than the inner diameter of the nut, and the outer diameter of Shim 20 is greater than the outer diameter of the nut. In this case, the connection of anchor rod 6 is more stable.

Among them, auxiliary components include construction baskets. In this case, the tools used during the construction process can be placed in the construction basket, making the construction process more convenient.

Figure 13:
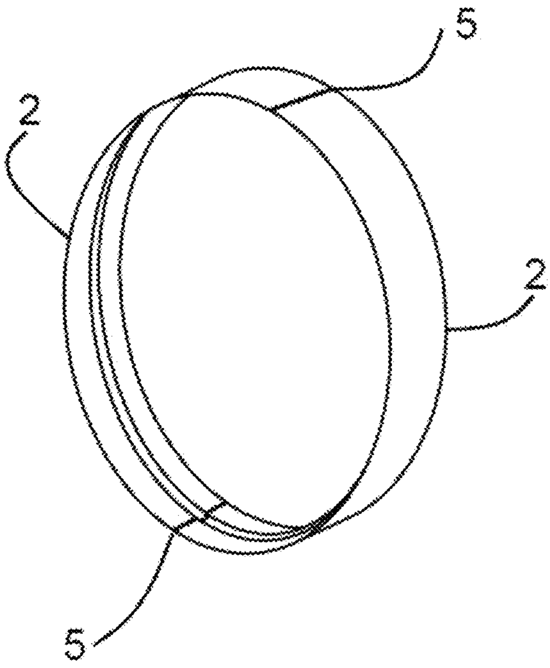
FIG. 13 is a schematic diagram of the three-dimensional structure of a typical direction of the annular groove-type shaped part provided by the embodiment of the invention.
Figure 14:
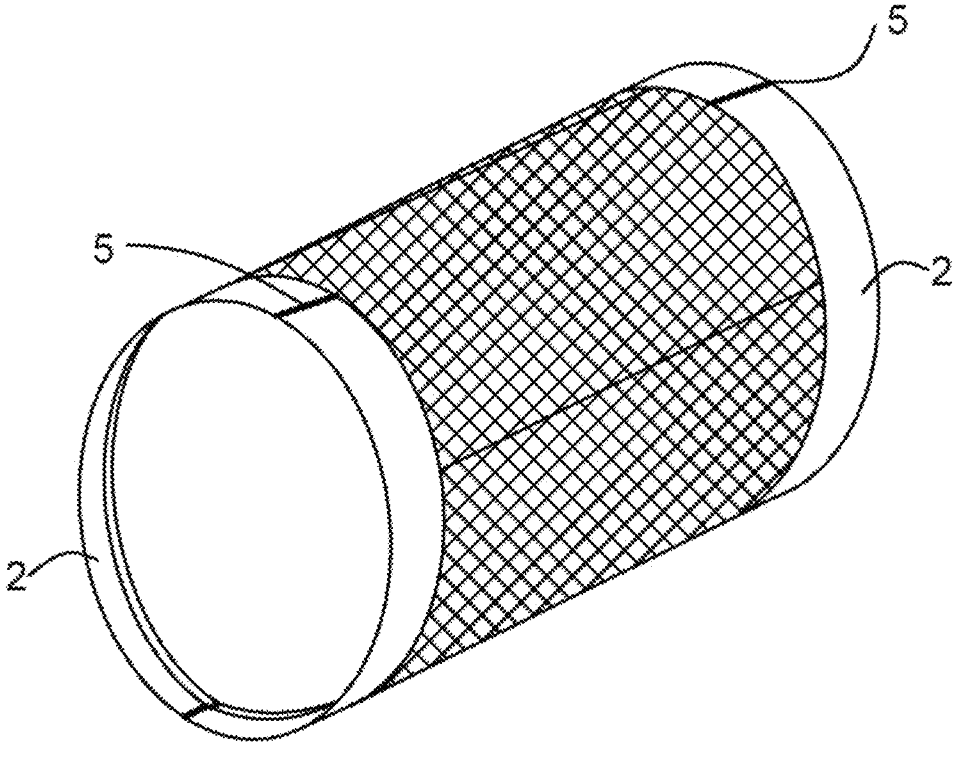
FIG. 14 is a schematic diagram of the three-dimensional structure of a typical direction of the sealing lining structure provided by an embodiment of the present invention.

The Dome Sealing Inner Lining Structure and Construction Method of Hook Plate Underground Rock Inner Lining Caves Referring to FIG. 13, the construction method of the dome sealing inner lining structure of the hook plate underground rock lining chamber provided by the present invention includes the following steps:

Step S1: Drill connection holes on concrete lining layer 1,

Step S2: Place the dome skeleton 3 and column skeleton 17 inside the concrete lining layer 1, and apply connecting bolts and the fixed bottom plate of the hook plate connectors provided by the dome skeleton 3 and column skeleton 17 to connect and fix the dome skeleton 3 and column skeleton 17 to the concrete lining layer 1;

Step S3: Connect the fan ring airtight layer 4 and the pillar ring airtight layer 18 to the dome skeleton 3 and the pillar skeleton 17, and obtain the dome sealing inner lining structure of the hook plate underground rock lined cavern.

The dome sealing inner lining structure of the hook plate underground rock lining cave provided by the implementation example of the present invention does not require the provision of an overall sealing inner lining structure in the concrete lining layer 1 during the construction process. Instead, a skeleton is first laid in the concrete lining layer 1, and the airtight layer is connected between the skeletons, ultimately forming the dome sealing inner lining structure of the underground rock lining cave. Compared to the overall sealing layer, the installation is more convenient, the work efficiency is higher, and the cost is lower.

Among them, the construction method of the dome sealing inner lining structure of the hook plate underground rock lining cavern also includes the following steps:

Step S4: Conduct experimental gas storage inside the dome sealed inner lining structure of the hook plate underground rock lined cavern, determine sealing performance, and monitor possible leakage points.

In this case, once the dome sealing lining structure of the hook plate underground rock lined cavern experiences air leakage, timely measures can be taken to repair it.

Although preferred embodiments of the present invention have been described, those skilled in the art may make additional changes and modifications to these embodiments once they have knowledge of the basic creative concepts. Therefore, the attached claims are intended to be interpreted as including preferred embodiments and all changes and modifications falling within the scope of the present invention.

Obviously, technicians in this field can make various modifications and variations to the present invention without departing from the spirit and scope of the present invention. In this way, if these modifications and variations of the present invention fall within the scope of the claims and their equivalent technologies, the present invention is also intended to include these modifications and variations.

The invention claimed is:

1. A groove-type skeleton, comprising a fixed base plate (2), wherein the fixed base plate (2) has a length direction and a width direction, wherein the fixed base plate (2) forms a clamping opening with a semi-open accommodation space at a central axis along the length direction, wherein a top edge of at least one side of the clamping opening with a semi-open accommodation space extends inward to form a protrusion, wherein a groove is formed on an inner side corresponding to the protrusion in the clamping opening with a semi-open accommodation space, wherein the protrusion and the groove together form a limit groove, and wherein a thickness of the fixed base plate (2) along the length direction at the central axis is greater than a thickness of the fixed base plate (2) on both sides, resulting in a bulge at the center of a radial cross-section of the fixed base plate (2) and a gradual decrease in thickness towards both sides.

2. The groove-type skeleton according to claim 1, wherein the fixed base plate (2) is in an axisymmetric structure with the central axis along the length direction as an axis of symmetry, and wherein a top edge on each of two opposite sides of the clamping opening with a semi-open accommodation space extends inward to form protrusions, so that an inner side corresponding to the protrusions in the clamping opening with a semi-open accommodation space forms grooves, and wherein the protrusions and corresponding grooves form limit grooves respectively.

3. The groove-type skeleton according to claim 1 wherein the groove-type skeleton is made of corrosion-resistant steel.

4. A sealing lining structure, comprising an airtight layer (3) and at least one groove-type skeleton as claimed in claim 1, wherein the airtight layer (3) is positioned on the groove-type skeleton via a limit groove formed at the clamping opening with a semi-open accommodation space.

5. The sealing lining structure according to claim 4, wherein the airtight layer (3) is made of a material that can be deformed under pressure.

6. The sealing lining structure according to claim 4, wherein an edge of the airtight layer (3) is provided with a fitting part that fits with the limit groove formed at the clamping opening of the semi-open accommodation space, and the airtight layer (3) is arranged on the groove-type skeleton through the fitting part.

7. The sealing lining structure according to claim 4, wherein a plurality of the groove-type skeletons are arranged in a crisscross pattern, forming a hollow space between them; and the airtight layer (3) is positioned within a hollowed-out area through a limit groove formed at the clamping opening with the semi-open accommodation space.

8. The sealing lining structure according to claim 4, wherein the sealing lining structure is arranged on an inner wall, wherein the inner wall is cylindrical shape, and the groove-type skeleton includes a plurality of axial skeletons and a plurality of circumferential skeletons, which are crisscrossed and connected to form a hollow space between the plurality of axial skeletons and the plurality of circumferential skeletons; and the airtight layer (3) is arranged in the hollow space through the limit groove formed at an opening with the semi-open accommodation space.

9. The sealing lining structure according to claim 8, wherein the plurality of axial skeletons and the plurality of circumferential skeletons are uniformly arranged.

10. An underground gas storage facility, comprising a concrete lining layer (1) and a sealing lining structure as claimed in claim 4, wherein an inner wall of the concrete lining layer (1) is cylindrical, and wherein the sealing lining structure is fixedly arranged on the inner wall of the concrete lining layer (1) through a fixed bottom plate (2) of the groove-type skeleton.

11. A method of constructing an underground gas storage, having a sealed lining structure as in claim 4, the method comprising:

assembling a groove-type skeleton according to an inner diameter of the underground gas storage, the groove-type skeleton comprising a plurality of axial skeletons and a plurality of circumferential skeletons, the plurality of axial skeletons and the plurality of circumferential skeletons being connected in a crisscross pattern, forming a hollow space between the plurality of groove-type skeletons;

laying the groove-type skeleton to an inner wall of the underground gas storage, and fixing the groove-type skeleton to the inner wall of the underground gas storage;

embedding an airtight layer (3) in a hollow through a limit groove formed at a clamping opening with a semi-open accommodation space, so that the inner wall of the underground gas storage forms a sealed lining structure as claimed in claim 4.

12. The method of constructing an underground gas storage according to claim 11, wherein laying the groove-type skeleton to the inner wall of the underground gas storage and fixing the groove-type skeleton to the inner wall of the underground gas storage, comprises:

drilling a first connection hole at a position on the inner wall of the underground gas storage;

adjusting a position of the groove-type skeleton so that a second connection hole of the groove-type skeleton corresponds to the position of the first connection hole on the inner wall of the underground gas storage; and simultaneously screwing a set bolt (4) into the first and second connection holes, so that the groove-type skeleton is fixed to the inner wall of the underground gas storage.

13. The method of constructing an underground gas storage according to claim 11, wherein after the step of embedding the airtight layer (3) in the hollow through the limit groove formed at the clamping opening with a semi-open storage space, the sealing lining structure is formed, the method further comprising:

conducting a gas storage test on the underground gas storage to determine a sealing performance of the underground gas storage;

monitoring in real-time for potential gas leakage points in the underground gas storage.

14. The underground gas storage according to claim 13, wherein during the step of real-time monitoring for possible leakage points of the underground gas storage, the possible leakage points include:

the connection between the airtight layer (3) and the groove-type skeleton, the connection between the connection part and the umbrella-shaped part of the groove-type skeleton, the connection between the fixed bottom plate (2) of the groove-type skeleton and the inner wall of the underground gas storage, and one or more parts of the airtight layer (3) itself.

15. The method of constructing an underground gas storage according to claim 13, wherein the real-time monitoring of possible leakage points in the underground gas storage comprises:

installing a plurality of gas flow monitoring instruments at possible leakage points in the underground gas storage, and labeling a location of each of the plurality of gas flow monitoring instruments;

setting an alarm threshold for each of the plurality of gas flow monitoring instruments according to the location of each of the plurality of gas flow monitoring instruments; and determining the location of a gas leakage point in the underground gas storage based on the location label of the gas flow monitoring instrument that triggered the alarm.

* * * * *